United States Patent
Wise et al.

(10) Patent No.: US 11,609,116 B2
(45) Date of Patent: Mar. 21, 2023

(54) OPEN-LOOP PHOTODIODE GAIN REGULATION

(71) Applicant: Banner Engineering Corp., Minneapolis, MN (US)

(72) Inventors: Ashley Wise, Plymouth, MN (US); Tim Dirks, Vadnais Heights, MN (US)

(73) Assignee: BANNER ENGINEERING CORP, Minneapolis, MN (US)

( * ) Notice: Subject to any disclaimer, the term of this patent is extended or adjusted under 35 U.S.C. 154(b) by 0 days.

(21) Appl. No.: 17/446,142

(22) Filed: Aug. 26, 2021

(65) Prior Publication Data

US 2022/0065693 A1 Mar. 3, 2022

Related U.S. Application Data

(60) Provisional application No. 63/071,080, filed on Aug. 27, 2020.

(51) Int. Cl.
| | |
|---|---|
| *G01J 1/44* | (2006.01) |
| *G01S 7/489* | (2006.01) |
| *H04B 10/69* | (2013.01) |

(52) U.S. Cl.
CPC ............... *G01J 1/44* (2013.01); *G01S 7/489* (2013.01); *H04B 10/6911* (2013.01); *G01J 2001/4466* (2013.01)

(58) Field of Classification Search
CPC ..... G01S 7/489; G01J 1/44; G01J 2001/4466; H04B 10/6911
See application file for complete search history.

(56) References Cited

U.S. PATENT DOCUMENTS

| | | | |
|---|---|---|---|
| 4,292,514 A | 9/1981 | Ohtomo | |
| 4,577,320 A | 3/1986 | Yoshikawa et al. | |

(Continued)

FOREIGN PATENT DOCUMENTS

| | | |
|---|---|---|
| CN | 1577539 A | 2/2005 |
| CN | 1300788 C | 5/2005 |

(Continued)

OTHER PUBLICATIONS

International Search Report and Written Opinion of the International Searching Authority in related International Application No. PCT/US2021/071304, dated Jan. 1, 2022, 11 pages.

(Continued)

*Primary Examiner* — Georgia Y Epps
*Assistant Examiner* — Don J Williams
(74) *Attorney, Agent, or Firm* — Craige Thompson; Thompson Patent Law; Timothy D. Snowden

(57) ABSTRACT

Apparatus and associated methods relate to an open-loop control circuit (OLCC) configured to determine a photodiode element (PDE) drive voltage as a function of a commanded photodiode gain level and a measured temperature signal. In an illustrative example the OLCC may receive a current temperature of an APD element. The OLCC may, for example, receive a commanded gain for the APD relative to a predetermined reference gain. The OLCC may, for example, retrieve a predetermined efficiency characteristic (PEC) of the APD based on the current temperature. If the temperature corresponds to a substantially non-linear portion of the PEC, the OLCC may, for example, determine the drive voltage as a function of the temperature and the commanded gain based on the PEC. Various embodiments may advantageously provide direct control of output gain of photodiodes over a wide dynamic range of temperature associated with the photodiode.

20 Claims, 16 Drawing Sheets

(56) References Cited

U.S. PATENT DOCUMENTS

| | | |
|---|---|---|
| 4,611,270 A | 9/1986 | Klauminzer et al. |
| 4,677,632 A | 6/1987 | Lisco et al. |
| 4,698,817 A | 10/1987 | Burley |
| 4,796,266 A | 1/1989 | Banwell et al. |
| 4,815,080 A | 3/1989 | Chesnoy et al. |
| 4,879,459 A | 11/1989 | Negishi |
| 4,903,273 A | 2/1990 | Bathe |
| 4,952,949 A | 8/1990 | Uebbing |
| 4,982,203 A | 1/1991 | Uebbing et al. |
| 4,995,045 A | 2/1991 | Burley et al. |
| 5,018,154 A | 5/1991 | Ohashi |
| 5,019,769 A | 5/1991 | Levinson |
| 5,146,464 A | 9/1992 | Uemura |
| 5,157,676 A | 10/1992 | Wilcox |
| 5,216,682 A | 6/1993 | Hedberg |
| 5,311,005 A | 5/1994 | Visocchi |
| 5,383,208 A | 1/1995 | Queniat et al. |
| 5,579,328 A | 11/1996 | Habel et al. |
| 5,604,757 A | 2/1997 | Liang et al. |
| 5,675,600 A | 10/1997 | Yamamoto et al. |
| 5,734,672 A | 3/1998 | Mcminn et al. |
| 5,752,100 A | 5/1998 | Schrock |
| 5,761,230 A | 6/1998 | Oono et al. |
| 5,844,928 A | 12/1998 | Shastri et al. |
| 5,850,409 A | 12/1998 | Link |
| 5,929,982 A | 7/1999 | Anderson |
| 6,108,114 A | 8/2000 | Gilliland et al. |
| 6,160,647 A | 12/2000 | Gilliland et al. |
| 6,195,370 B1 | 2/2001 | Haneda et al. |
| 6,313,459 B1 | 11/2001 | Hoffe et al. |
| 6,414,974 B1 | 7/2002 | Russell et al. |
| 6,466,595 B2 | 10/2002 | Asano |
| 6,661,820 B1 | 12/2003 | Camilleri et al. |
| 6,671,248 B2 | 12/2003 | Miyabata et al. |
| 6,711,189 B1 | 3/2004 | Gilliland et al. |
| 6,917,639 B2 | 7/2005 | Ishida et al. |
| 6,947,456 B2 | 9/2005 | Chin et al. |
| 6,975,658 B1 | 12/2005 | Roach |
| 7,031,621 B2 | 4/2006 | Nagakubo et al. |
| 7,209,502 B2 | 4/2007 | Brosnan et al. |
| 7,217,914 B2 | 5/2007 | Stewart et al. |
| 7,447,247 B1 | 11/2008 | Doscher |
| 7,473,880 B2 | 1/2009 | Brosnan et al. |
| 7,620,329 B2 | 11/2009 | Reintjes et al. |
| 7,663,090 B2 | 2/2010 | Byren |
| 7,738,796 B2 | 6/2010 | Sanchez |
| 8,055,138 B2 | 11/2011 | Zhang |
| 8,195,055 B2 | 6/2012 | Vieira et al. |
| 8,279,416 B2 | 10/2012 | Reiner et al. |
| 9,985,414 B1 | 5/2018 | Wise |
| 10,256,938 B2 | 4/2019 | Ishii |
| 2002/0064193 A1 | 5/2002 | Diaz et al. |
| 2004/0052299 A1 | 3/2004 | Jay et al. |
| 2004/0135992 A1 | 7/2004 | Munro |
| 2005/0025018 A1 | 2/2005 | Hsu et al. |
| 2005/0078722 A1 | 4/2005 | Wu et al. |
| 2005/0180473 A1 | 8/2005 | Brosnan et al. |
| 2007/0057160 A1 | 3/2007 | Kaku et al. |
| 2007/0195477 A1 | 8/2007 | Brosnan et al. |
| 2009/0016387 A1 | 1/2009 | Durkin et al. |
| 2009/0141761 A1 | 6/2009 | Egawa |
| 2010/0301194 A1 | 12/2010 | Patel et al. |
| 2011/0260623 A1 | 10/2011 | Morita et al. |
| 2012/0194258 A1 | 8/2012 | Nien et al. |
| 2014/0197140 A1 | 7/2014 | Unrath et al. |

FOREIGN PATENT DOCUMENTS

| | | |
|---|---|---|
| CN | 1655413 A | 8/2005 |
| CN | 104604051 A | 5/2015 |
| CN | 104903044 A | 9/2015 |
| CN | 110308456 B | 5/2021 |
| EP | 0421674 A2 | 4/1991 |
| EP | 2363927 A2 | 9/2011 |
| WO | 03069379 A2 | 8/2003 |
| WO | 2003069379 A3 | 2/2004 |
| WO | 2007132182 A2 | 11/2007 |
| WO | 2016184246 A1 | 11/2016 |

OTHER PUBLICATIONS

Rev Analog Devices, "Avalanche Photodiode Bias Controller and Wide Range (5 nA to 5 mA) Current Monitor ADL5317", Jan. 1, 2005 (Jan. 1, 2005), XP055403823, Retrieved from the Internet, <http://www.analog.com/media/en/technical-documentation/data-sheets/ADL5317.pdf>.

Kataoka et al., "An Active Gain-control System for Avalanche Photo-Diodes under Moderate Temperature Variations," Nuclear Instruments and Methods in Physics Research Section A: Accelerators, Spectrometers, Detectors and Associated Equipment, vol. 564, No. 1, pp. 300-307, Aug. 2006, retrieved from the internet Aug. 5, 2021, doi: 10.1016/j.nima.2006.03.033.

Chapter II Demand in related International Application No. PCT/US2021/071304, dated May 24, 2022, 27 pages.

International Preliminary Report on Patentability in related International Application No. PCT/US2021/071304, dated Jul. 8, 2022, 30 pages.

OPEN-LOOP PHOTODIODE GAIN REGULATION

CROSS-REFERENCE TO RELATED APPLICATIONS

This application claims the benefit of U.S. Provisional Application Ser. No. 63/071,080, titled "OPEN-LOOP PHOTODIODE GAIN REGULATION," filed by Ashley Wise, et al., on Aug. 27, 2020.

This application incorporates the entire contents of the foregoing application(s) herein by reference.

The subject matter of this application may have common inventorship with and/or may be related to the subject matter of U.S. application Ser. No. 15/625,949 titled "Open-Loop Laser Power-Regulation," filed by Ashley Wise, et al., on Jun. 16, 2017, issued as U.S. Pat. No. 9,985,414 on May 29, 2018.

TECHNICAL FIELD

Various embodiments relate generally to applications using photodiodes and photodiode drivers.

BACKGROUND

Photodiodes, including avalanche photodiodes (APDs), are employed in a range of applications. Applications may include, but are not limited to, presence and positioning in photoelectric sensors, distance measurement in triangulation and time of flight sensors, and fiber-optic communication.

SUMMARY

Apparatus and associated methods relate to an open-loop control circuit (OLCC) configured to determine a photodiode element (PDE) drive voltage as a function of a commanded photodiode gain level and a measured temperature signal. In an illustrative example the OLCC may receive a current temperature of an APD element. The OLCC may, for example, receive a commanded gain for the APD relative to a predetermined reference gain. The OLCC may, for example, retrieve a predetermined efficiency characteristic (PEC) of the APD based on the current temperature. If the temperature corresponds to a substantially non-linear portion of the PEC, the OLCC may, for example, determine the drive voltage as a function of the temperature and the commanded gain based on the PEC. Various embodiments may advantageously provide direct control of output gain of photodiodes over a wide dynamic range of temperature associated with the photodiode.

Various embodiments may achieve one or more advantages. For example, some embodiments may provide photodiode output gain control for arbitrary gain levels. Some embodiments may advantageously provide rapid response control of APD gain, such as without an iterative servo process to a desired gain level. In various embodiments, gain control based on predetermined efficiency characteristics may advantageously provide control (e.g., open-loop control) of photodiodes (e.g., APDs) at or beyond reverse breakdown voltage. Various embodiments may advantageously maintain a photodiode in a control region having a (predetermined) minimum gain resolution across a range of temperatures.

Some embodiments may, for example, provide enhanced precision, open-loop control. Usable dynamic range of a photodiode and system may, for example, be advantageously increased. Various embodiments may advantageously provide more responsive, cost effective, and/or compact optical detection implementations.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case is briefly introduced with reference to FIG. 1. Second, with reference to FIG. 2, a hardware block diagram further defines an exemplary open-loop control circuit (OLCC). Third, with reference to FIG. 3, an example block diagram illustrates an exemplary implementation of OLCC in a system. Next with reference to FIGS. 4-14, the discussion turns to exemplary embodiments that illustrate details of OLCC calculations, specifically, methods of calculating photodiode input voltage for desired photodiode output gain. With reference to FIGS. 15 and 16, exemplary software flow diagrams outline the general functional methodologies of exemplary OLCCs. Finally, the document discusses further embodiments, exemplary applications and aspects relating to an OLCC for gain control of photodiode elements.

Figure 1:
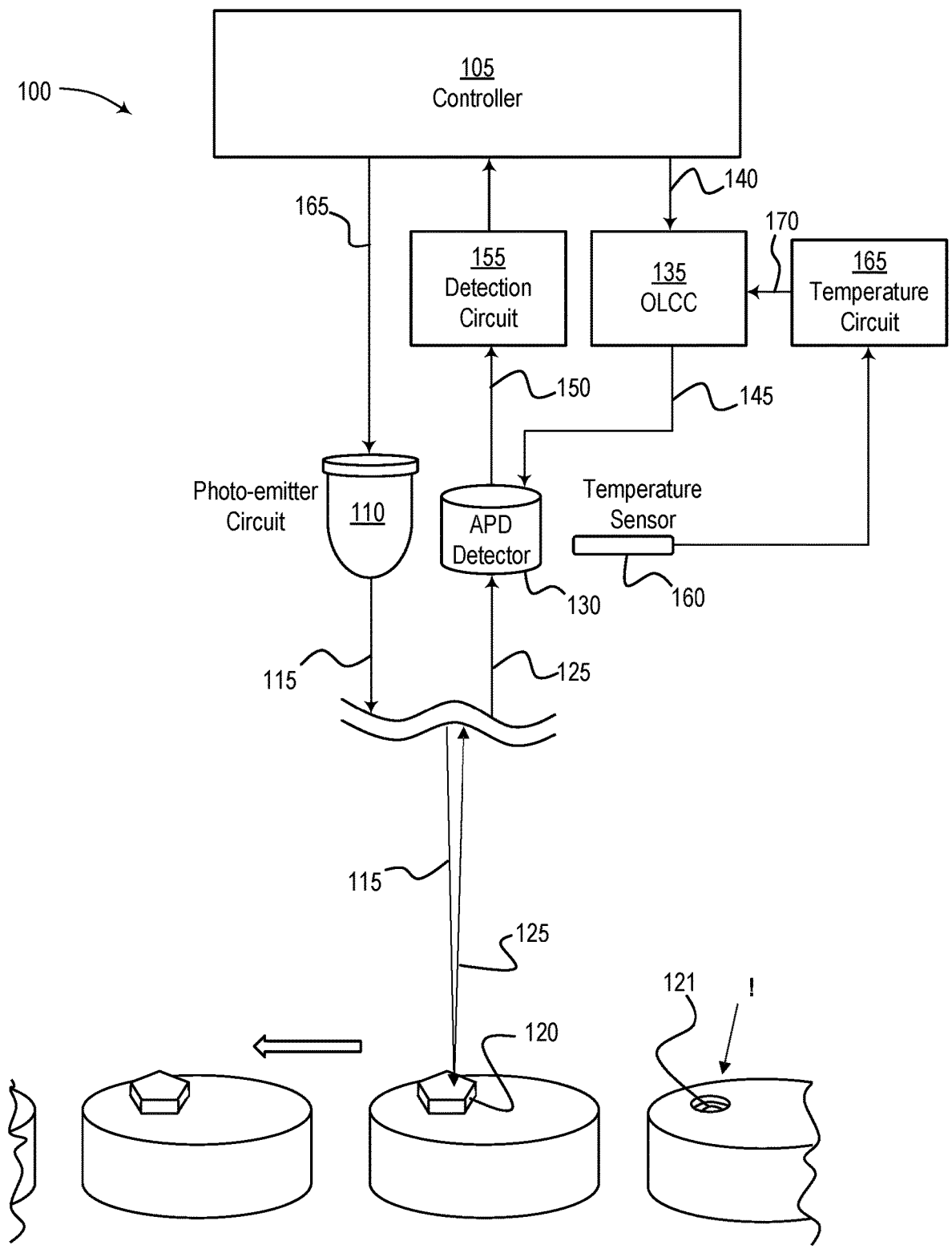
FIG. 1 depicts a mixed block diagram and perspective view of an exemplary open-loop control circuit (OLCC) factory use case.

FIG. 1 depicts a mixed block diagram and perspective view of an exemplary open-loop control circuit (OLCC) factory use case. An exemplary OLCC factory use case 100 includes a controller 105. The controller 105 is electrically coupled to drive a photo-emitter circuit 110. In operation, the photo-emitter circuit 110 (e.g., a lasing element and drive circuit) is driven by controller 105 to generate a beam 115. The beam 115 is targeted on the head of a bolt 120. A reflected beam 125 makes its way to a photodiode detector 130. The photodiode may be, for example, designed to operate in high reverse bias voltage, such as an avalanche photodiode (APD). In some examples, the transit time of the beams 115 and 125 may be used to determine distance. In some examples, the percent remission of the beams 115 and 125 may be used to determine intensity/distance. In further examples, a return angle of the reflected beam 125 may be used to determine distance. Accordingly, any one or combination of these methods may be employed to determine distance. In the depicted use case 100, if the beam 115 had landed upon a missing head of a bolt 120 or a void 121, the location distance determined from the reflected beam 125 may have been indicative of the anomaly.

In operation, the OLCC 135 receives a photodiode (PD) gain level 140 from the controller 105. Further, the OLCC 135 calculates a drive voltage 145 from the received PD gain level 140. The OLCC 135 is electrically coupled to PD detector 130. The PD detector 130 receives the drive voltage 145 and generates electrical signal 150 according to a relative gain determined by the drive voltage 145. Due to the drive voltage 145, calculated by the OLCC 135 in response to the commanded PD gain level 140, the PD detector 130 outputs the electrical signal 150 at a gain.

The detector 130 is electrically coupled to a detection circuit 155. The detection circuit 155 may include analog and/or digital components (e.g., analog conditioning, FPGA, ASIC). The detection circuit 155 may be operable to convert analog signals to digital signals which may be sent to the controller 105. Accordingly, the detection circuit 155 converts the output of the detector 130 into a digital form readable by the controller 105. In some embodiments, the detection circuit 155 may be an analog conditioning circuit, sending a conditioned analog signal from the detector 130 to the controller 105. Further, in such embodiments, the controller 105 may be operable to receive an analog signal.

The ambient temperature surrounding the detector 130 is sensed by a temperature sensor 160. The temperature sensor 160 is electrically coupled to a temperature circuit 165. The temperature circuit 165 converts the signal from the temperature sensor 160 into a temperature signal 170 readable by the OLCC 135. The OLCC 135 may advantageously provide optimal voltage control for arbitrary input PD gain level 140 and temperature signals 170 within linear and non-linear regions of PD response, increasing usable dynamic range.

Figure 2:
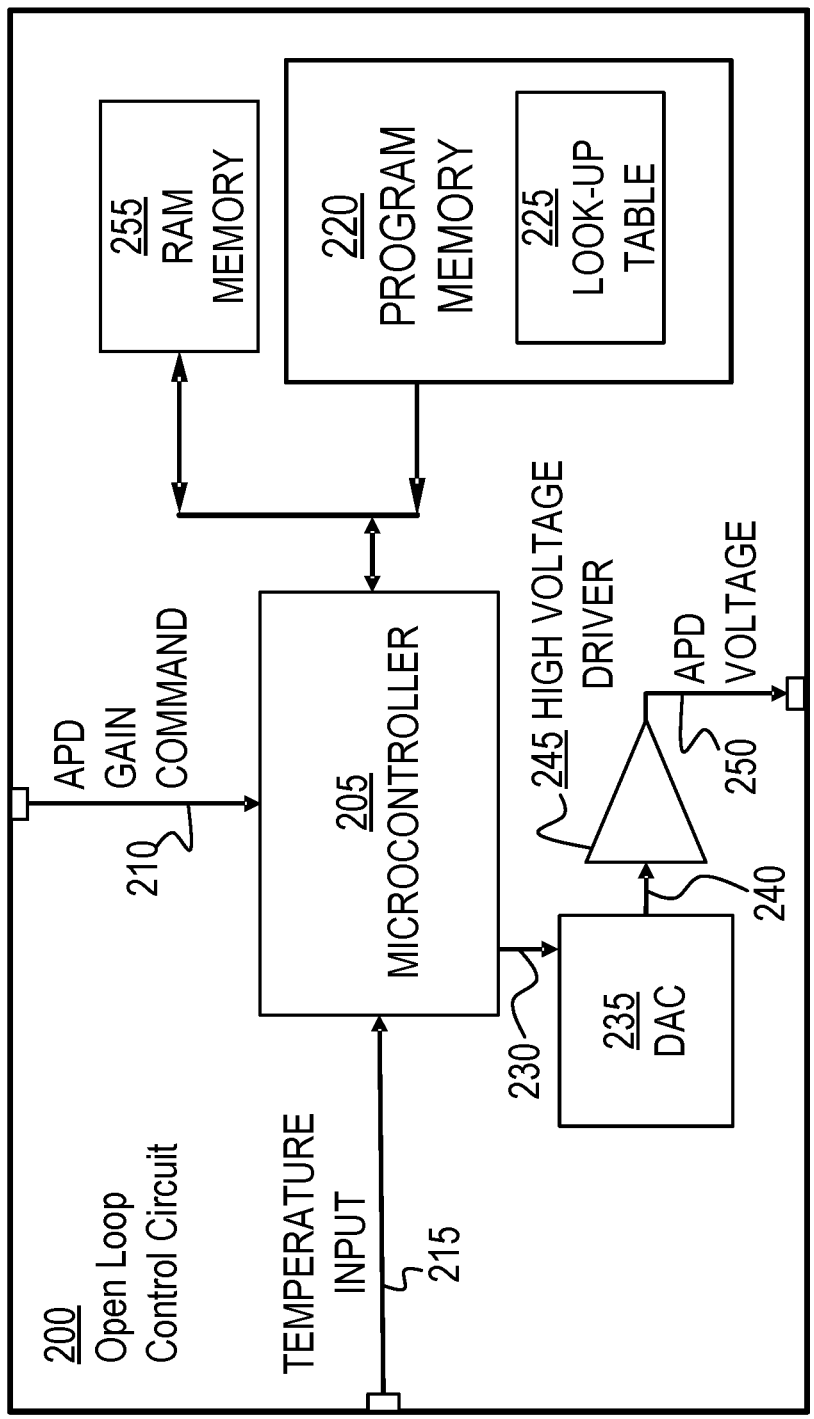
FIG. 2 depicts a block diagram of an exemplary OLCC.

FIG. 2 depicts a block diagram of an exemplary OLCC. An OLCC 200 includes a microcontroller 205. The microcontroller 205 receives a PD gain command 210 and a temperature input 215. The microcontroller 205 accesses a look-up-table (LUT) 225 within a program memory 220 to retrieve predetermined parameters representative of a characteristic of output PD voltage vs. relative gain at each of a number of temperatures. In various examples, the LUT may be pre-programmed in internal and/or external non-volatile memory (e.g., electrically erasable programmable read-only memory (EEPROM)). Further, the LUT may be loaded into volatile memory (random access memory (RAM)) to facilitate run-time execution. In some embodiments, the LUT may be pre-programmed into flash memory. In some examples, the LUT may be copied into flash memory during run-time execution.

A number of implementations have been described regarding the location and use of the LUT. Nevertheless, it will be understood that various techniques and memory devices may be employed. For example, advantageous results may be achieved if the steps of the disclosed techniques were performed in a different sequence, or if components were combined in a different manner, or if the components were supplemented with other components. Accordingly, other implementations are contemplated.

By determining the drive voltage needed to generate the commanded gain at the measured temperature indicated by the temperature input 215, the microcontroller 205 may determine a PD voltage drive value 230. The look up table, which is explained in more detail herein, is operable to provide a resulting PD voltage drive data value in response to a value representing the particular desired gain, adjusted for the measured temperature.

The microcontroller 205 writes the determined PD voltage drive value 230 to an analog converter (DAC) 235. In some examples, the DAC 235, as well as other peripherals (e.g., memory, pulse width modulators (PWMs), timers, and analog-to-digital converters (ADCs)) may be grouped with the microprocessor and embodied as a microcontroller. The DAC 235 converts the PD voltage drive value 230 to an analog signal 240. The analog signal 240 is fed to a high voltage driver 245, which may, for example, have a low impedance output. The output of the high voltage driver 245 is a PD voltage 250 operable to drive a PD detector. The OLCC 200 may advantageously control a PD voltage 250, resulting in PD voltage control for arbitrary input PD gain commands 210 and ambient temperature inputs 215 within linear and nonlinear regions of PD response based on predetermined parameter values stored in the look-up-table 225.

The microcontroller 205 couples to a RAM memory 255. The RAM memory 255 may facilitate basic executional functionality to the microcontroller 205. In some examples, the RAM memory 255 may be included within the microcontroller 205. In some examples, the program memory 220 with the look-up-table 225 may also be included in the microcontroller 205.

In some embodiments, as it relates to the block diagram of FIG. 1, the controller 105 may include a dedicated microcontroller. In various examples, the microcontroller within the controller 105 may be the microcontroller 205 in FIG. 2. Accordingly, the OLCC 135 may be exemplified by the OLCC 200, and as such may include the microcontroller 205. In some embodiments, the controller 105 (e.g., microcontroller(s)), the microcontroller 205, and/or the supporting members may be supplemented by, or incorporated in hardware programmable devices, such as FPGAs, for example.

In some embodiments, the OLCC 135 and/or the OLCC 200 may be a software algorithm running on the controller 105 (e.g., microcontroller(s)) and/or the microcontroller 205. Further, the controller 105 and/or the microcontroller 205 may include embedded DAC, ADC, RAM, and/or Flash memory. In some embodiments, external EEPROM may be employed.

Figure 3:
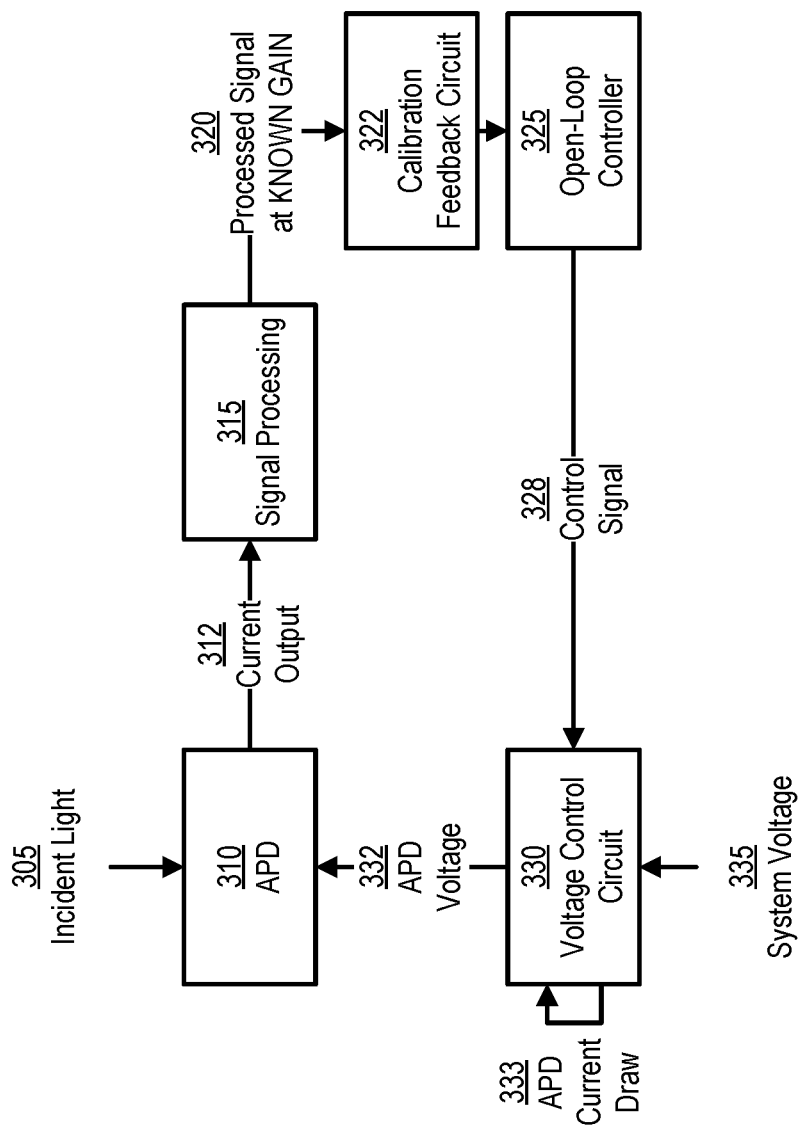
FIG. 3 depicts a block diagram of an exemplary implementation of an OLCC, such as is described in reference to FIGS. 1-2.

FIG. 3 depicts a block diagram of an exemplary implementation of an OLCC, such as is described in reference to FIGS. 1-2. OLCC 325 may set a control signal 328 that is used by voltage controller circuit 330 to drive PD voltage 332 to a level required for a desired PD gain level. Voltage controller circuit 330 uses the control signal 328 and a system voltage 335 and generates therefrom the appropriate PD voltage 332. In the depicted example the voltage controller circuit 330 may monitor an APD current draw 333 (e.g., to monitor the PD voltage 332 generated).

The PD 310, when it receives incident light 305, generates a current output 312 with a gain proportional to the PD voltage 332. The PD current output 312 proceeds through a signal processing electrical path which may, for example, include filters, additional gain stages, current to voltage conversion, and digitization via analog to digital converters. A processed signal 320 results, which is produced from an PD output at a predetermined PD gain level. Accordingly, the signal may be processed through a calibration feedback circuit 322 to provide input to OLCC 325. Because the signal is produced at a known gain level of the PD, the signal may be, for example, evaluated in calibration feedback circuit 322, and an optimized gain level determined and provided to the OLCC 325. In various embodiments, the calibration feedback circuit 322, signal processing 315, OLCC 325, or some combination thereof may, for example, be implemented in one or more microcontrollers, FPGAs, or other integrated circuits.

Figure 4:
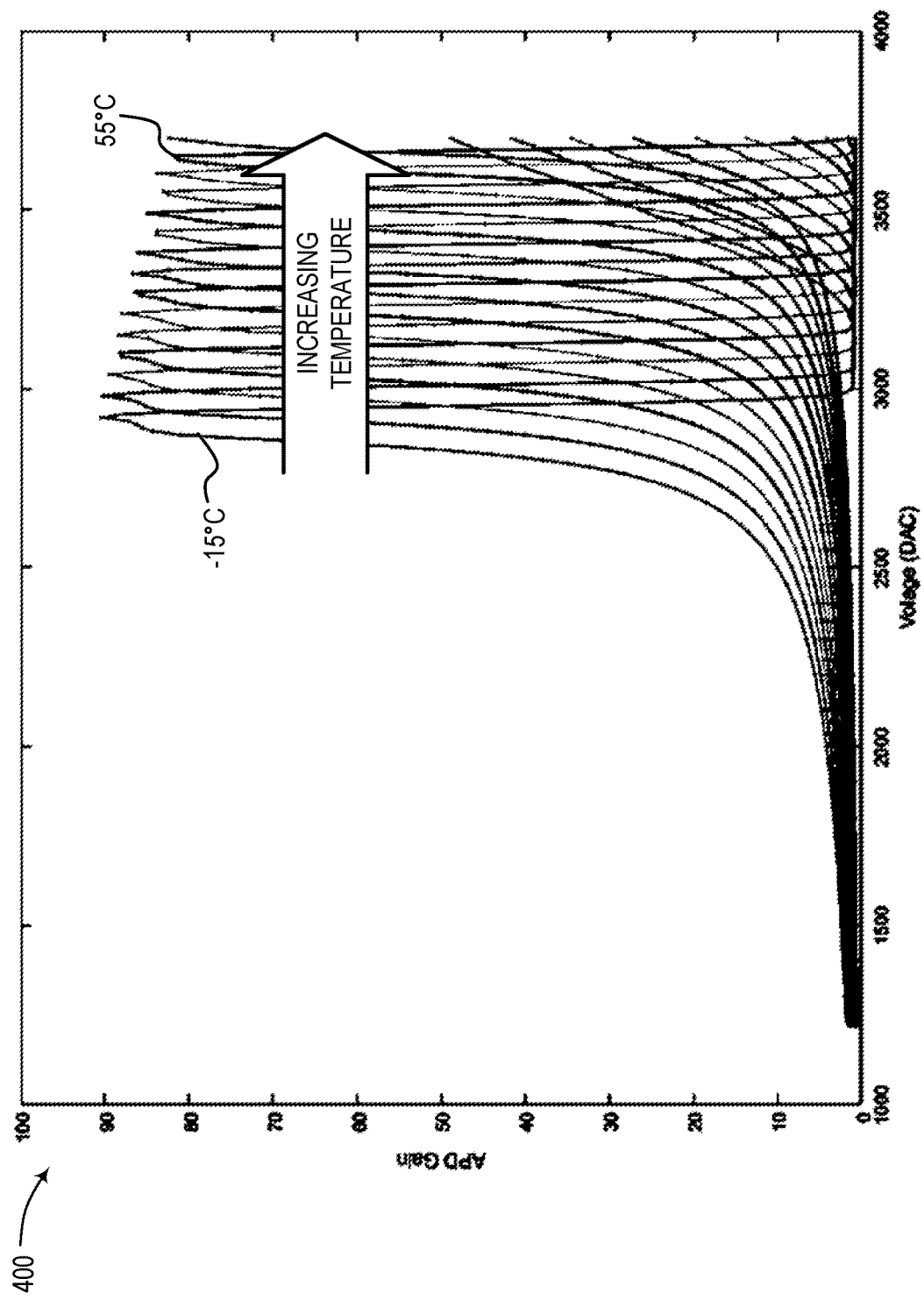
FIG. 4 depicts a graph of a family of temperature curves for output current gain versus input voltage for an exemplary APD.

FIG. 4 depicts a graph of a family of temperature curves for output current gain versus input voltage for an exemplary APD. A family of curves 400 includes a y-axis representing an APD output current gain relative to a predetermined base (1×) gain. The family of curves 400 also includes an x-axis representing input voltage (in a scaled unit corresponding to an exemplary DAC, where 20 DAC units=1V) driving the APD.

For a given input voltage to the APD, the resulting APD gain changes non-linearly over a temperature. Therefore, for a given input voltage, the corresponding gain changes non-linearly over temperature. The corresponding gain vs temperature is also dependent on the level input voltage. An OLCC, such discussed in reference to FIGS. 1-3, may adjust the voltage to maintain a desired gain for a range of temperatures. Further, since the non-linear voltage input over temperature is different for every desired APD gain, the OLCC may employ a look-up-table (LUT) to generate an array of APD input voltages for an array of APD gain across temperature.

For example, in the family of curves 400, if input voltage is fixed at 3000 DAC (150V), the relative linear APD gain varies from 3× gain to 10,000× gain over a 70° C. temperature range. At the upper end of the range, the APD is operating in Geiger mode. Such a wide variance in gain may be unacceptable for many applications. Simply limiting the allowed operating temperature range and using a fixed voltage value that is safe over the full allowed temperature range may be problematic in many applications, because the high slope of the APD gain permits only a very narrow temperature range. Heating and cooling devices used to keep the APD within a sufficiently narrow temperature range to use a fixed voltage value results in considerable size and power requirements that may not be tractable for many industrial sensor, measurement, and vision systems.

Controlling gain by monitoring the APD current draw from the power supply and servo controlling the APD voltage in a closed feedback loop (e.g., using a feedback ASIC) may also be infeasible in many implementations. APD current draw is proportional to the output current resulting from incident light and may, thus, serve as a representation of gain. A strong incident light signal to the APD may use a low APD voltage to maintain a fixed current output (gain level), and a weak incident light signal to the APD may use a high APD voltage to maintain a fixed current output. However, although APD current draw may be used as a proxy or metric for APD gain, such systems are typically not realistic where incident light is not known a priori, and in which the incident light may have a high dynamic range. For example, in many industrial environments, the incident light may range from being so weak (or there may be no incident light) that the APD voltage is raised too high and the APD enters an unstable Geiger mode, to being so strong that the APD voltage drops too low into a range where the APD ceases to function properly.

Accordingly, various embodiments may advantageously be implemented in industrial sensor, measurement, and vision systems operating in ambient temperature with maximum size, power, or cost requirements that preclude temperature-limited options. Various embodiments may be configured to operate, by way of example and not limitation, between −10° C. to +50° C., or between −40° C. to +70° C. Various embodiments may be configured to operate in implementations having no constraints on incident light levels. Such embodiments may operate, by way of example and not limitation, in environments range from zero returned light incident on the APD to 10's of Watts of returned light incident on the APD. Various embodiments may provide an open-loop control of one or more APD to maintain a predetermined APD gain level over a wide range of temperatures and incident light levels.

Figure 5:
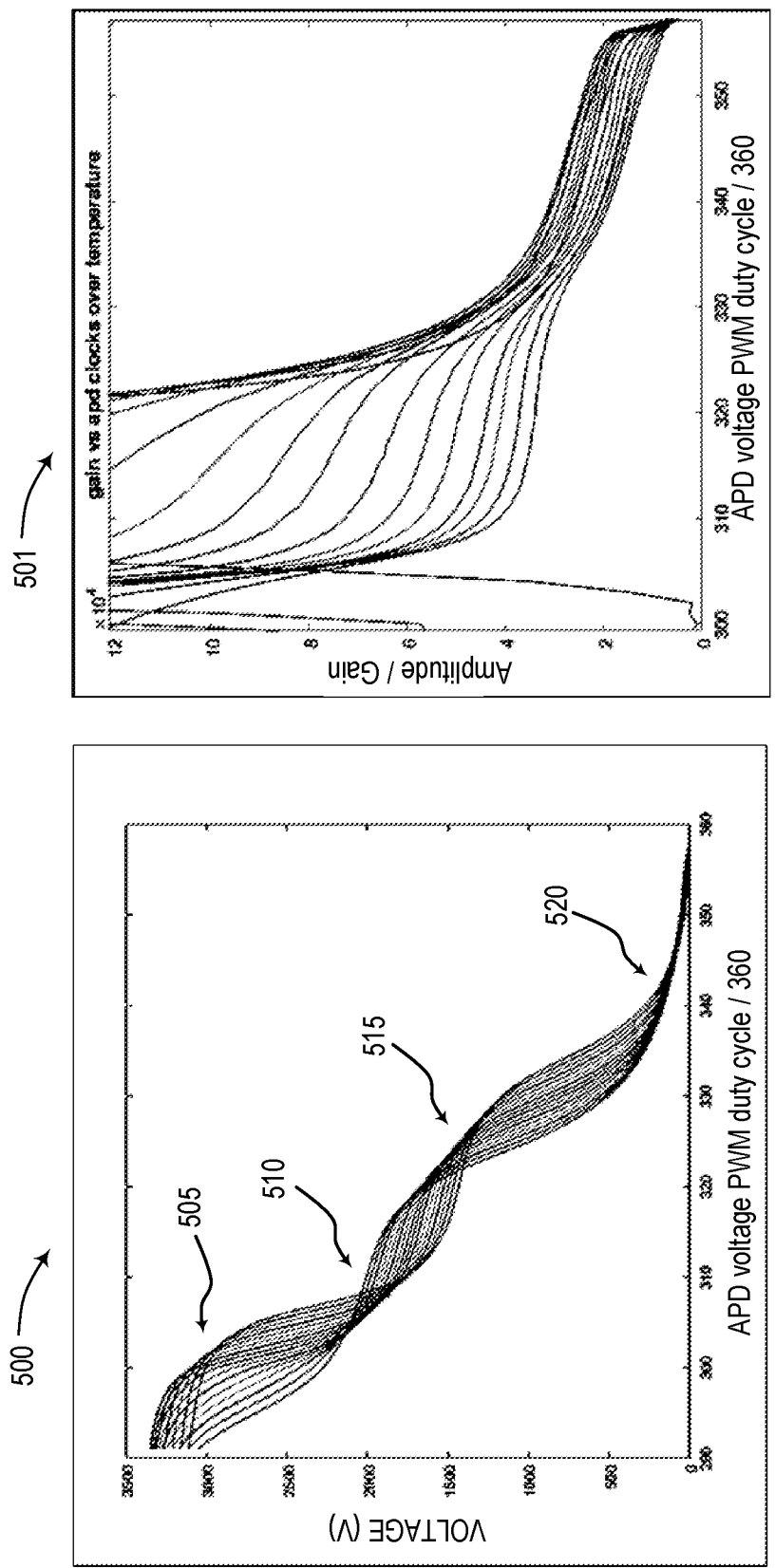
FIG. 5 depicts graphs of a family of temperature curves for voltage versus pulse-width modulation (PWM) duty cycle and gain versus PWM duty cycle in an exemplary APD.

FIG. 5 depicts graphs of a family of temperature curves for voltage versus pulse-width modulation (PWM) duty cycle and gain versus PWM duty cycle in an exemplary APD. In some exemplary embodiments, an output of an open-loop controller (such as a PWM waveform or analog DAC) may be converted into an APD voltage. The system voltage may, for example, be at a typical electrical level (5V) or a typical industrial power supply level (10V-30V). In various embodiments, this 5V to 30V input may be required to be converted up to, for example, about 200V. Many PWM to voltage approaches result in non-linearities. One such type of non-linearity is slope changes in a duty-cycle to voltage curve. The graph 500 depicts a family of temperature curves for PWM duty period (x-axis) versus high-voltage (y-axis, given in 12-Bit ADC units). There are four changes, or inflections, in slope, 505, 510, 515, and 520. Furthermore, the position of these changes varies over temperature (each individual plot represents a different temperature between −20° C. to 55° C.). Accordingly, it may be intractable to drive a known voltage over multiple temperatures.

Similarly, graph 501 depicts a family of temperature curves, for the same example as shown in graph 500, for PWM duty cycle (x-axis) versus APD gain (y-axis). The non-linear voltage curve (graph 500) results in a non-linear gain curve (graph 501), as well as dramatic changes in gain over temperature due to this non-linearity.

Figure 6:
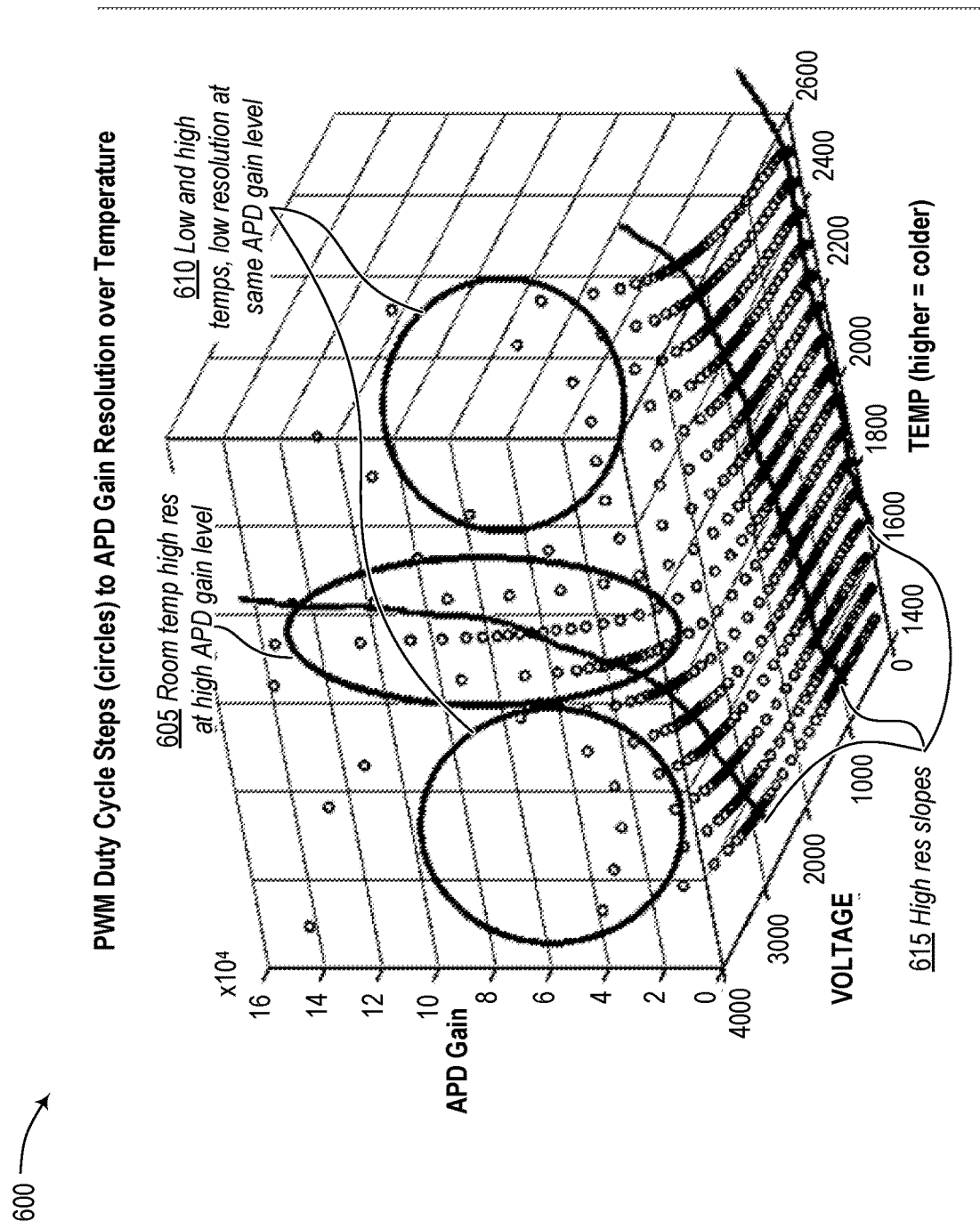
FIG. 6 depicts a family of temperature curves for PWM duty cycle steps versus APD gain in an exemplary APD.

FIG. 6 depicts a family of temperature curves for PWM duty cycle steps versus APD gain in an exemplary APD. A PWM system may have limited duty cycle resolution. Graph 600 plots actual PWM resolution as discrete points against APD voltage (x-axis, in 12-bit ADC units) to gain (z-axis, scaled by $10^4$), over temperature (y-axis, in ADC units). Each small circle represents an equal step out of an open-loop controller driving APD voltage. Due to the nonlinear voltage relationship, the density of the steps in terms of final APD gain is also nonlinear. The steps are dense, or allow fine adjustment of APD gain, at certain gain levels, and the steps are sparse, or allow only coarse adjustment of APD gain, at certain gain levels. Further, due to the nonlinearity over temperature, the APD gain level of where these points are coarse versus dense changes dramatically with temperature. Some combinations of desired APD gain and temperature, such as those in regions 610, may be too coarse of a resolution to be feasibly controlled with a discrete open-loop controller. Region 605 represents a high-resolution region at high APD gain level for room temperature. Three slopes 615 indicate three regions of high resolution. Various embodiments may advantageously control gain to remain in higher resolution regions by adjusting voltage as temperature varies.

It may be desirable to maintain consistent APD gain, for example, in implementations in which it may be important to control a dynamic range of a system. A photodiode, for example, may have a dark level and a saturation level which, together, set of range of incident light that can be tolerated by the system. Voltage level of an APD output signal feeding into electronics or an ADC may have a minimum noise level or ADC resolution, and a maximum voltage level. Accordingly, various embodiments may control the gain of the APD to advantageously provide control over downstream voltages and signal levels to ensure, for example, that the resulting signal is strong enough to exceed minimum signal-to-noise limits, while also not so strong as to saturate components. Similarly, in some embodiments, gain is controlled to adapt for a dynamic range of incident light greater than a circuit dynamic range. Such embodiments may require knowledge of the current gain, so that gain of the system may be rapidly and appropriately adjusted. For example, if the current gain needs to be reduced by half, or the current gain needs to be doubled, this may, for example, only be able to be accomplished if the current level of gain is known, as well as what voltage is needed at the current temperature to achieve the desired gain level.

Figure 7:
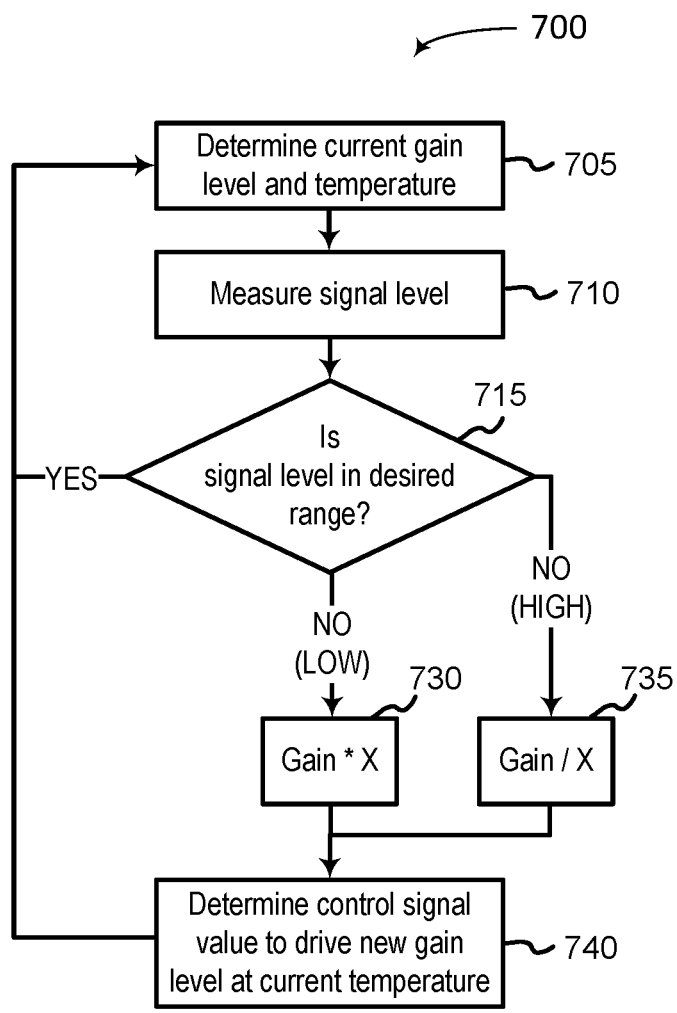
FIG. 7 depicts a block diagram of an exemplary gain control flow implemented with knowledge of a current temperature and a current gain level.

FIG. 7 depicts a block diagram of an exemplary gain control flow implemented with knowledge of a current temperature and a current gain level. In gain control system 700, a current gain level and current ambient temperature for the APD is determined 705. A signal level from the APD is measured 710, which may be directly from the APD or a signal therefrom after signal processing. The signal level is evaluated 715 to determine if the signal level is in a predetermined desired range. If the signal level is within the desired range, no change is made to the gain, and the current gain level and temperature are re-determined 705. If the signal level is too low, a factor "X" is determined 730 by which the current gain should be multiplied by in order to bring the gain within the desired range. If the signal level is too high, a factor "X" is determined 735 by which the current gain should be divided in order to bring the gain within the desired range. The factor "X" is used to determine 740 a control signal value to be used in driving a new gain level at the current temperature. The control signal value may be determined 740, for example, as disclosed in relation to FIGS. 1-3, and elsewhere herein.

Figure 8:
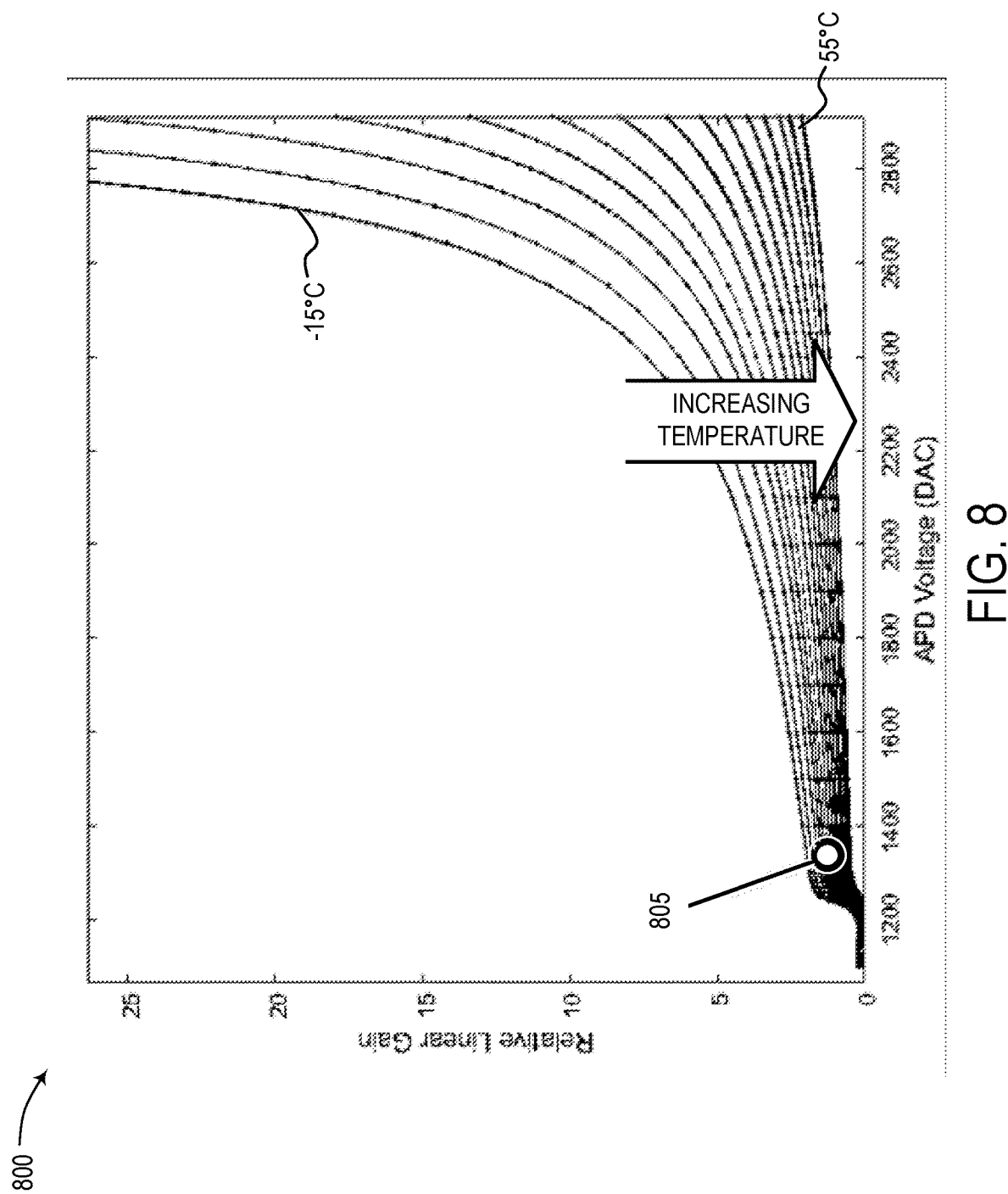
FIG. 8 depicts an exemplary relative reference gain selected in a family of temperature curves for relative linear gain vs APD voltage in an exemplary APD.

FIG. 8 depicts an exemplary relative reference gain selected in a family of temperature curves for relative linear gain vs APD voltage in an exemplary APD. In the family of temperature curves 800, relative linear gain (y-axis) is plotted against voltage supplied to an APD (x-axis, DAC units where 1 V=20 DAC), each individual plot line representing a relationship at a given temperature. The plots represent relationships at increasing temperature from −15° C. to 55° C.

Gain may, for example, be a multiplier and, thus, rely on a reference. Various embodiments may advantageously enable monitoring of a current relative APD gain level by providing a fixed reference for 1× gain. In the exemplary embodiment shown in FIG. 8, reference point 805 is selected as a fixed "1× gain" reference point for relative gain adjustment. Exemplary reference point 805 is selected from a plot representing room temperature and represents a qualitative selection of a point after the APD response to input voltage stabilizes (e.g., after a second inflection point, where the first inflection point is approximately at voltage (DAC units)=1225, and the second inflection point is approximately at voltage (DAC units)=1250).

A fixed reference for 1× gain may provide a reference for relative adjustments of gain. In exemplary embodiments, for the purposes of gain control it may only be important to know a ratio between a current gain level and a desired gain level, and not an actual absolute gain level. For example, it may be important in a given situation to know that the gain should be increased or decreased, for example, by a factor of 2 relative to a reference gain.

Figure 9:
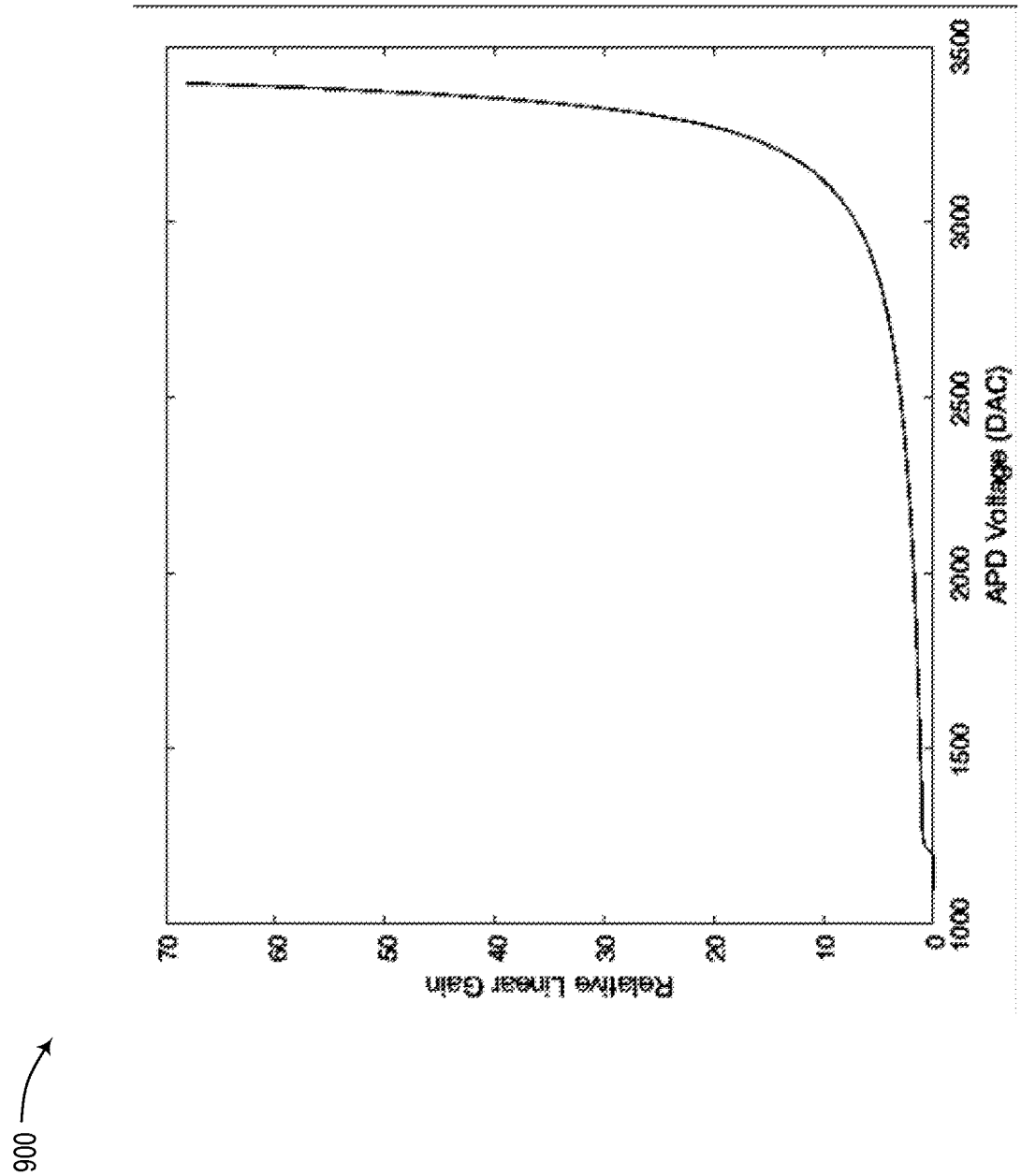
FIG. 9 depicts a gain versus voltage calibration curve for an exemplary APD at room temperature.
Figure 10:
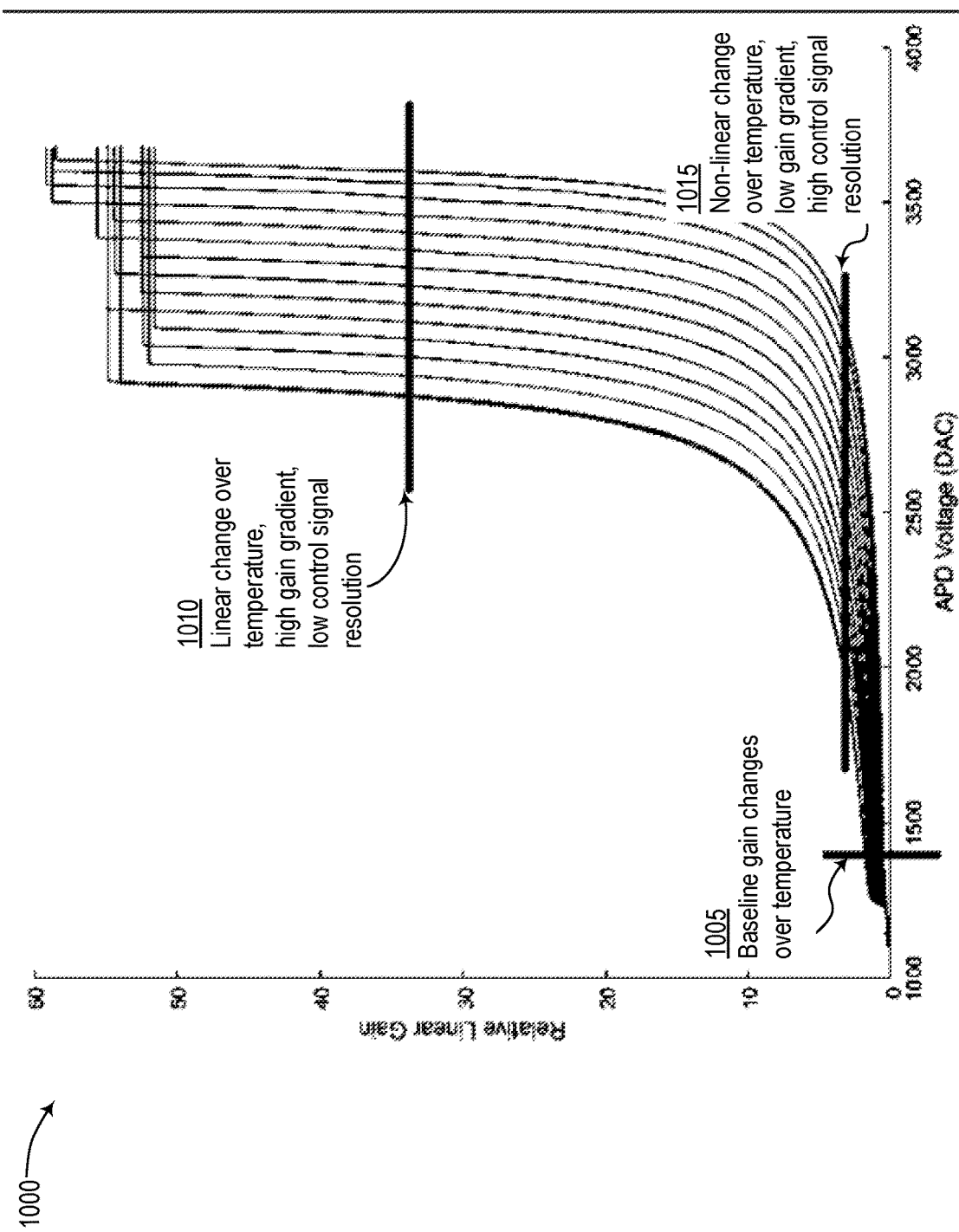
FIG. 10 depicts graphs of a family of temperature curves plotting relative linear gain versus APD input voltage for an exemplary APD.

FIG. 9 depicts a gain versus voltage calibration curve for an exemplary APD at room temperature. Graph 900 is the result of a calibration of an exemplary open-loop control signal plotting relative linear gain (y-axis) to voltage driving the APD (x-axis, DAC units) at a room temperature of 20° C. FIG. 10 depicts graphs of a family of temperature curves plotting relative linear gain versus APD input voltage for an exemplary APD. shows how this curve shifts over temperature. Graph 1000 is the result of multiple calibration curves, such as shown in FIG. 9, performed at multiple temperatures. For example, an exemplary APD (or multiple exemplary APDs) may be placed in a controlled-temperature environment, and temperature incrementally changed between successive calibrations sweeping voltage across a range while measuring gain (e.g., through current draw). The resulting family of calibration curves, such as are shown in FIG. 10, may be used to correlate relative gain, voltage, and temperature. Various embodiments may advantageously employ this correlation to measure input voltage and ambient temperature of an APD to monitor and control the APD's gain.

Various embodiment may solve key difficulties in modeling how APD gain changes over temperature. The exemplary family of calibration curves depicted in FIG. 10 can be divided into three major regions. Low-gain region, around indicator 1005, is dominated by a baseline gain, or unity gain, that changes over temperature. Low-to-mid gain region, around indicator 1015, is dominated by non-linear changes over temperature, low grain gradient, and high control signal resolution. Mid-to-high gain region, around indicator 1010, is dominated by high gain gradient and low resolution of the control signal (which may be, for example, DAC or PWM control). Modeling APD gain response to input voltage across all three regions may be difficult, and may be infeasible with any degree of accuracy, if modelled, for example, by a first order slope.

Various embodiments may solve these difficulties by performing a per-APD (e.g., for a specific APD implementation, a specific family or class of APDs, a specific brand and model of APDs, or other similar selection for calibration) calibration at one reference temperature that is not limited to only a few APD gain levels. The reference temperature may be, for example, at standard operating conditions at room temperature. This calibration may 'learn' a substantially complete APD gain curve, such as is shown in FIG. 10, and may not be limited to a first order slope. This calibration may be stored into memory, by way of example and not limitation, as coefficients to a multi-order equation, as a look-up-table (LUT), or some combination thereof. For example, a reference curve for two variables (e.g., two of APD relative gain, APD input voltage, and temperature) may be stored as coefficients in a multi-order polynomial equation, and adjustments to the curve across a third variable (e.g., the unselected variable of relative gain, voltage, and temperature) may be stored in a LUT, or vice versa.

Figure 11:
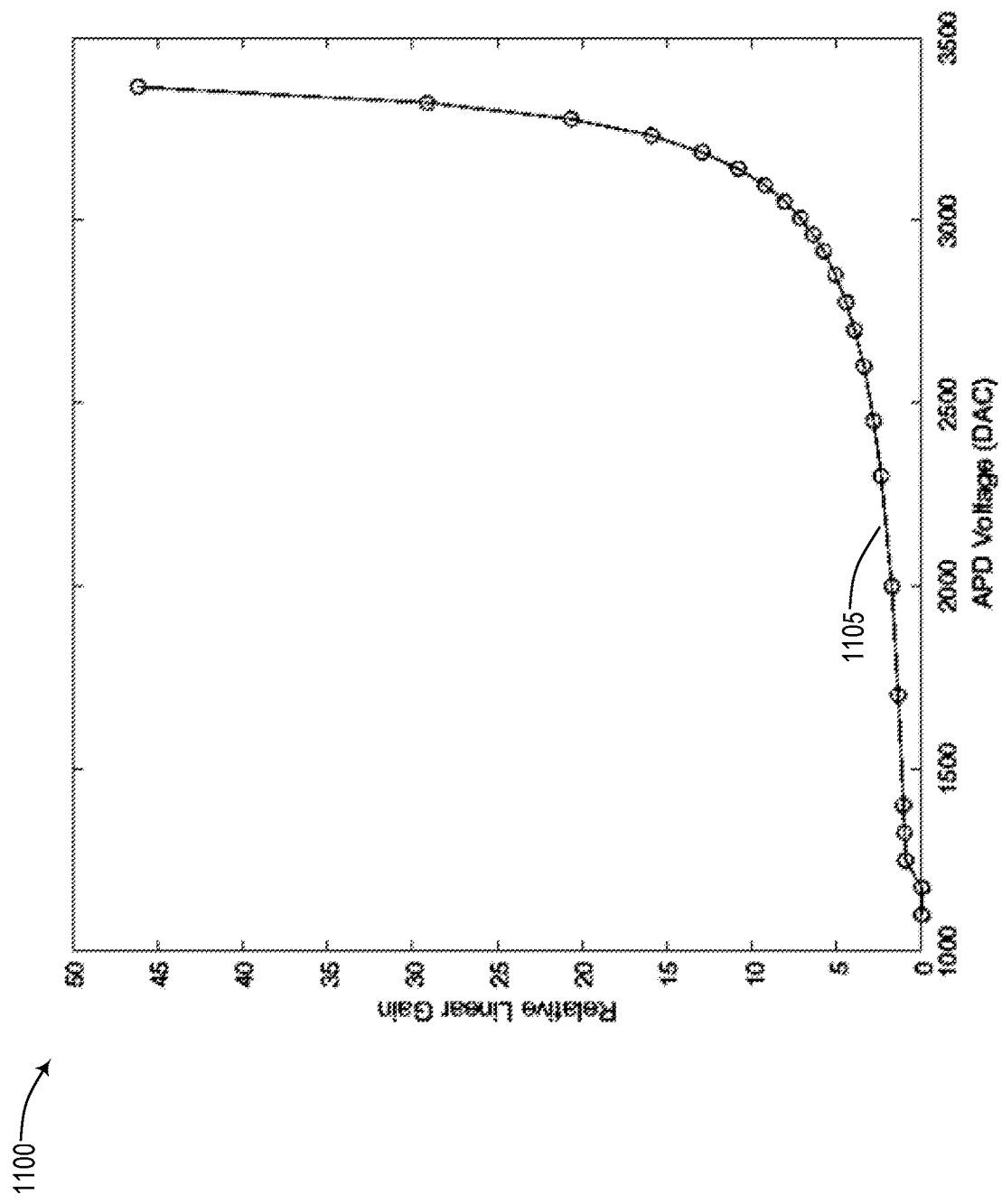
FIG. 11 depicts an exemplary control signal to APD gain look-up table (LUT) or equation calibration model.

FIG. 11 depicts an exemplary control signal to APD gain look-up table (LUT) or equation calibration model. Graph 1100 represents a relative linear gain (y-axis) plotted versus a control signal (x-axis, represented by APD input voltage (DAC units)), as determined by an equation (represented by solid line 1105) and by a LUT (represented by the circle reference points on line 1105). Various embodiments implementing open loop gain control according to a predetermined multi-order gain to input voltage relationship may advantageously generate any desired APD gain level across a broad, non-linear range of gain.

Figure 12:
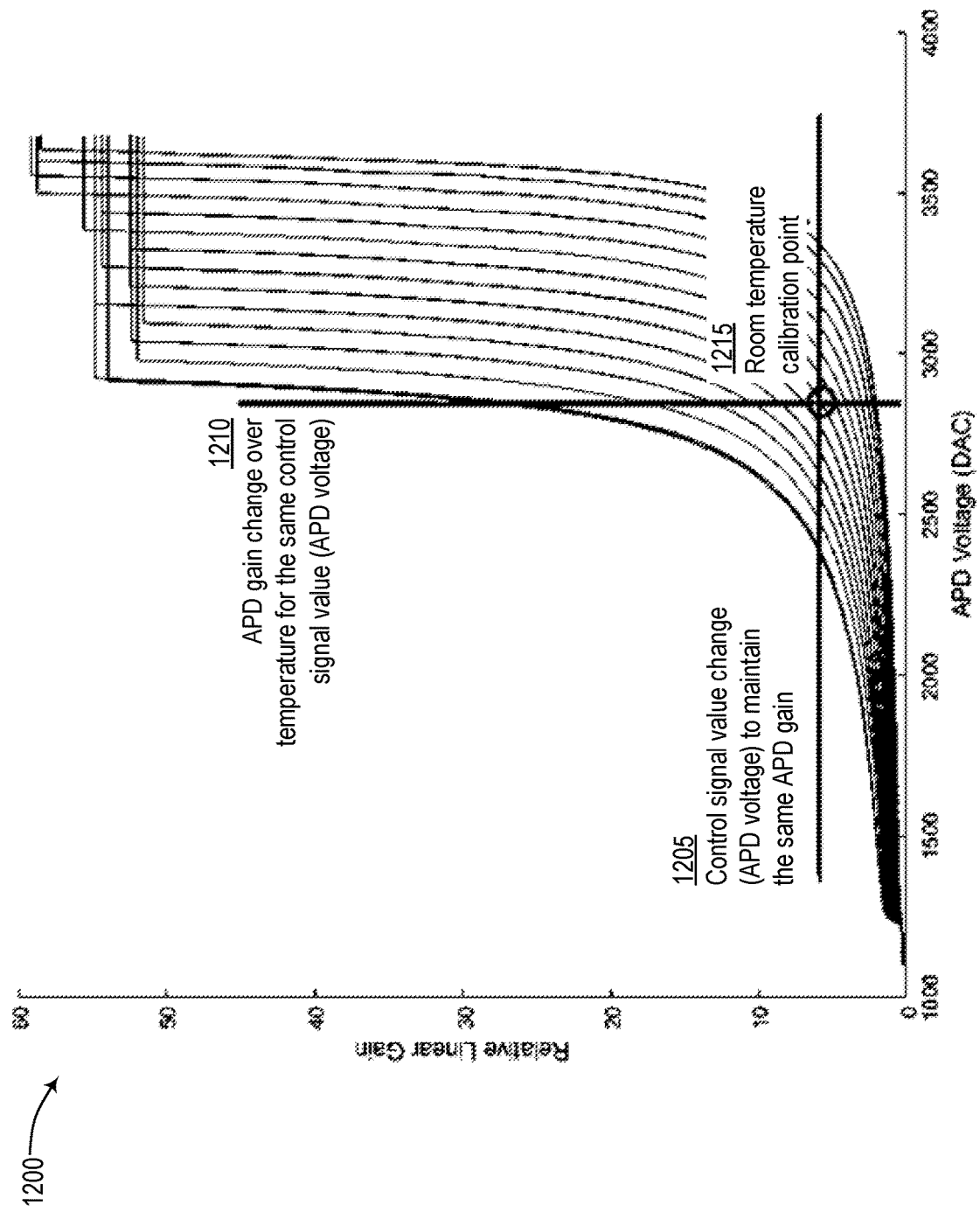
FIG. 12 depicts an exemplary calibration of control signal to gain across multiple temperatures for an exemplary APD.

FIG. 12 depicts an exemplary calibration of control signal to gain across multiple temperatures for an exemplary APD. Graph 1200 depicts a family of plots of APD gain change (y-axis) versus APD voltage input (the control signal for this example) over temperature. Various embodiments may, for example, implement a APD gain calibration curve and adjust it over temperature. Point 1215 is an exemplary calibration point selected on a room temperature calibration curve. For a given open-loop control signal (for example, a DAC or PWM control to a high voltage generation), the resulting APD gain may change non-linearly over temperature. The way the APD gain changes may be different for every control signal value. Line 1210 represents APD gain change over temperature for a given control signal value (e.g., APD input voltage).

Furthermore, for a given APD gain level, the required control signal may change non-linearly over temperature. The required control signal may change in a way that is different for every APD gain level. Line 1205 represents how the control signal value (e.g., APD voltage) must change across temperatures to maintain the same level of APD gain.

In various implementations, compensation may be performed on a control signal required to maintain a desired APD gain for the given temperature. In various implementations, a key compensation variable may be used as a control signal instead of an APD gain level. In some embodiments, compensation of the control signal may advantageously reduce computation intensity and simplify implementation for a given level of accuracy. Various embodiments may advantageously provide increased accuracy, response, and dynamic range by adjusting the entire calibration curve instead of only utilizing a first order efficiency slope or only compensating based on a limited number (e.g., one or two) APD gain levels.

Because non-linear compensation over temperature is different for every desired APD gain level, some embodiments may generate a multitude of compensations for a multitude of APD gain levels. The compensation curve for a given APD gain level may be implemented, for example, in the form of a multi-order equation or a LUT. In various such embodiments, a combination of LUTs or equations may be used to determine a control signal at any temperature according to a desired APD gain level. In embodiments implementing LUTs, for example, values between LUT entries may be interpolated using various means, including but not limited to linear or spline interpolation. Implementing interpolation between LUT values allows a continuous choice of APD gain level and temperature, not limited to the resolution of the LUT.

Figure 13:
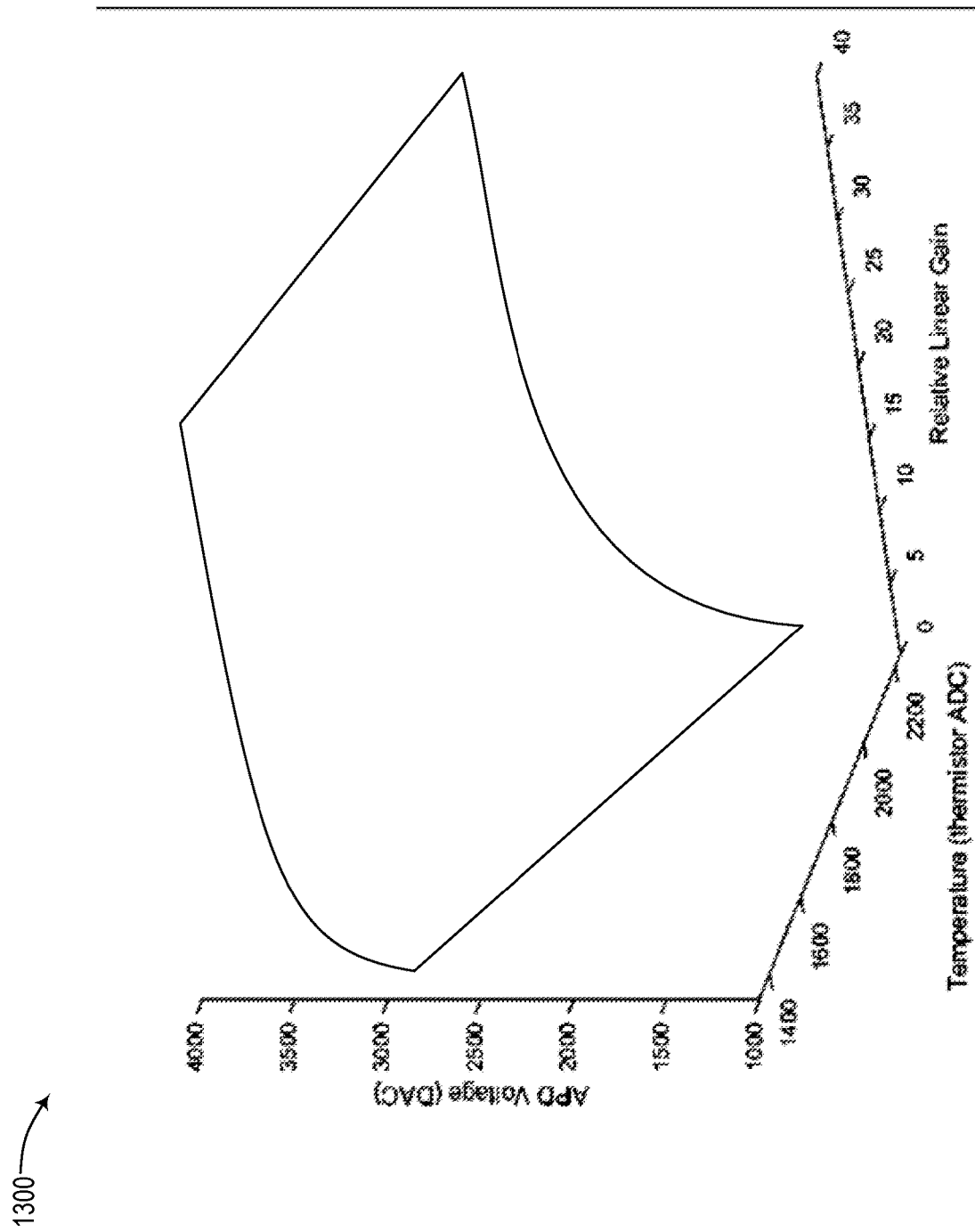
FIG. 13 depicts a two-dimensional surface of a gain versus temperature versus voltage profile of an exemplary APD.

FIG. 13 depicts a two-dimensional surface of a gain versus temperature versus voltage profile of an exemplary APD. Three-dimensional (3D) surface 1300 represents a three-variable calibration profile for an exemplary APD. A relative linear gain of the APD is plotted against both voltage (DAC units) and temperature (as read from a thermistor ADC). Various embodiments may calibrate one or more APD units over temperature to generate a multi-variable calibration profile which may be represented as a 3D surface. This multi-variable calibration profile may be advantageously used to determine a known APD gain level across a range of temperatures.

Figure 14:
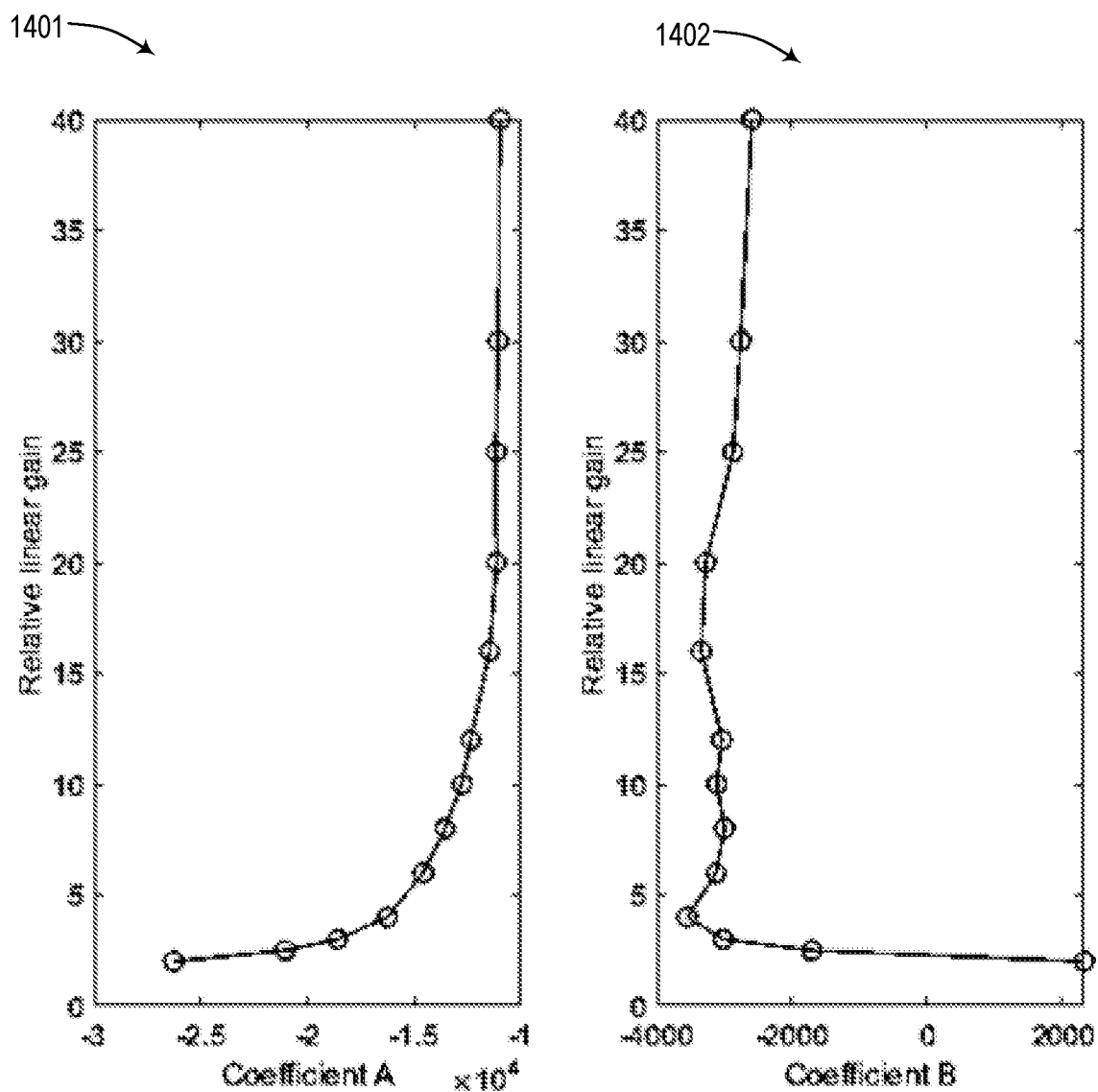
FIG. 14 depicts relationships of exemplary coefficients to APD gain for an exemplary APD.
Figure 15:
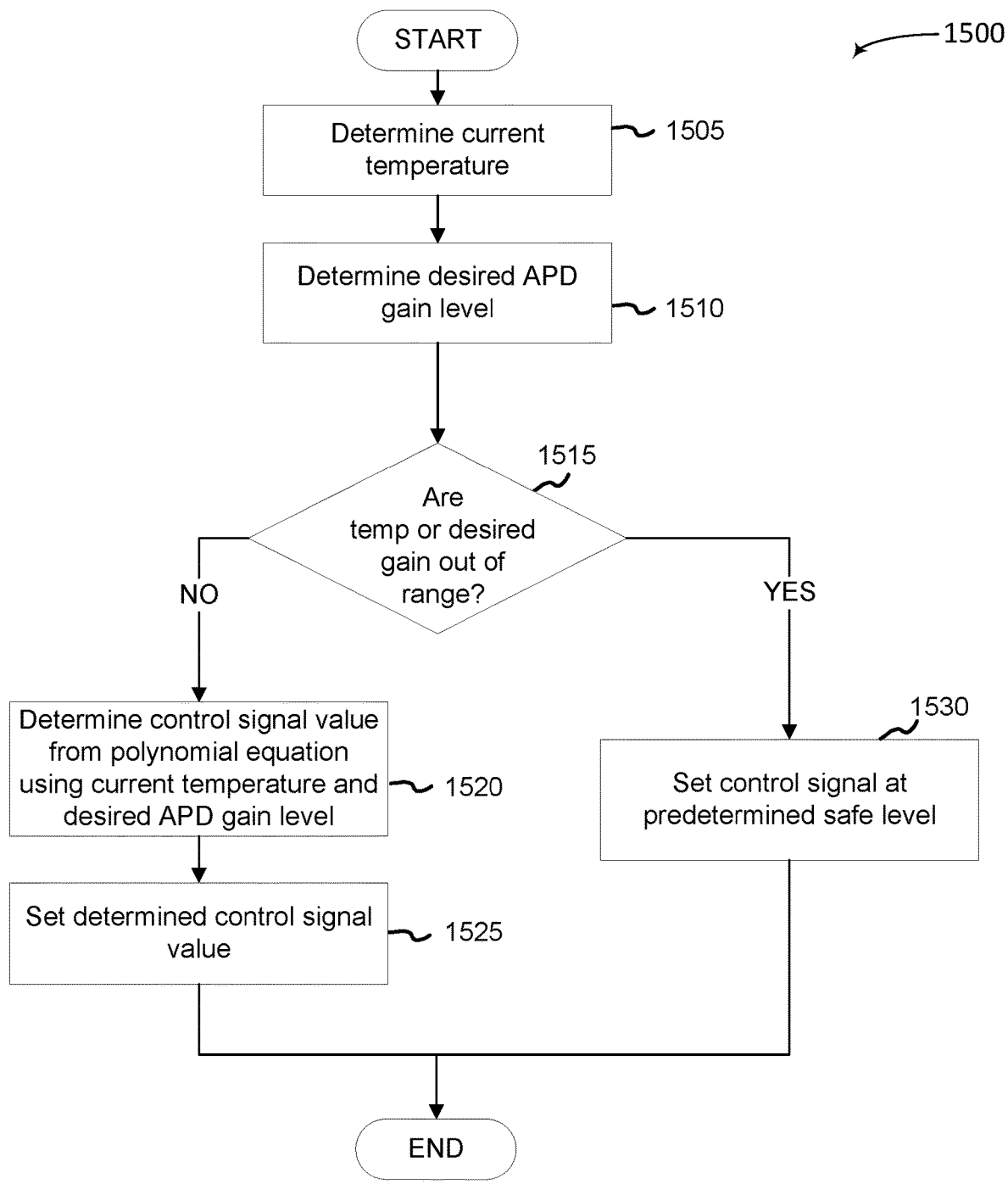
FIG. 15 depicts an exemplary open loop method for controlling APD gain level according to temperature.

FIG. 14 depicts relationships of exemplary coefficients to APD gain for an exemplary APD. Graph 1401 plots coefficient A against relative linear gain, and graph 1402 plots coefficient B against relative linear gain. In this example embodiment, A and B are coefficients of a multi-order polynomial represented by Equation 1, below:

$$\Delta V = f(T), \qquad \text{EQUATION 1:}$$

where $\Delta V$ is change in voltage (DAC units), and f is a multi-order polynomial function dependent on temperature (T).

FIG. 15 depicts an exemplary open loop method for controlling APD gain level according to temperature. Method 1500 begins by determining 1505 current temperature of an APD. A desired APD gain level is determined 1510. The desired APD gain level may be determined, for example, by a controller circuit, and may depend on a current gain level of the APD. For example, a controller may determine that the APD gain should be increased by a factor of 2 to increase signal strength from the APD. The desired gain level and the current temperature are evaluated 1515 to determine whether either are out of a predetermined operating range. If yes, a control signal is set 1530 to a predetermined safe level. In various embodiments, for example, the control signal may be set using extrapolation (e.g., linear and/or polynomial extrapolation for temperatures beyond calibrated limits), capping (e.g., change in voltage may be capped or limited to voltage correlated to a maximum or minimum calibrated temperature), or some combination thereof. For example, if the desired gain is out of range, the voltage may be adjusted up or down according to a predetermined calibration profile to bring the gain within a desired operating range. If the control signal value is within the predetermined range, a control signal value may be determined 1520 from a polynomial equation using current temperature and desired APD gain level. The control signal value is then set 1525 to drive the APD to the desired gain level based on the current temperature.

Figure 16:
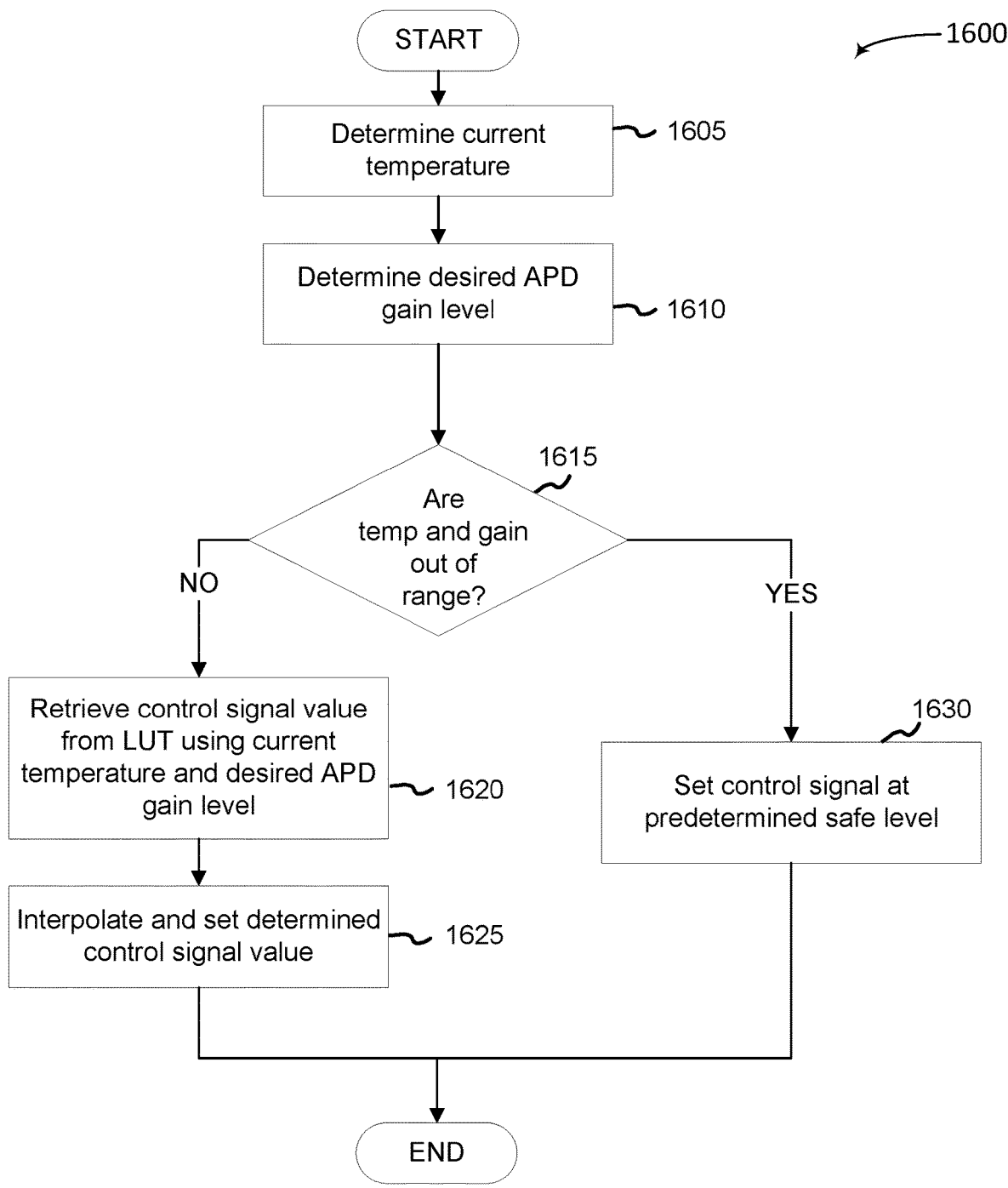
FIG. 16 depicts a second exemplary open loop method for controlling APD gain level according to temperature.

FIG. 16 depicts a second exemplary open loop method for controlling APD gain level according to temperature. Method 1600 begins by determining 1605 current temperature of an APD. A desired APD gain level is determined 1610. The desired gain level and the current temperature are evaluated 1615 to determine whether either are out of a predetermined operating range. If yes, a control signal is set 1630 to a predetermined safe level. If the control signal value is within the predetermined range, a control signal value may be determined 1620 by retrieving a control signal value from a lookup table using current temperature and desired APD gain level. The control signal value is then interpolated, if the desired gain and current temperature do not correspond exactly to a predetermined value in the LUT, and set 1625 to drive the APD to the desired gain level based on the current temperature. Methods 1500 and 1600 may, for example, be embodied in program instructions. The program instructions may be advantageously stored in memory of an OLCC or controller and may be executed by a controller operably connected thereto to advantageously control gain of one or more APD elements by driving an input voltage.

Although various embodiments have been described with reference to the figures, other embodiments are possible. Various embodiments may provide direct PD gain control using an open-loop design to maintain direct knowledge of the current PD gain level, thereby advantageously enabling a PD to be directly commanded (e.g., by driving voltage of the PD) to a desired PD gain level over a wide temperature range. Open-loop implementations may, for example, advantageously simplify designs by removing at least some electrical current measurement feedback paths. Simplification of design may decrease implementation costs, increase response speed, and decrease size requirements. Various embodiments may provide temperature-guided PD gain control, which may advantageously allow systems to work over a wide temperature range. Such embodiments may advantageously eliminate the need for large, expensive, high-power usage, environmental temperature control systems.

Various embodiments provide PD gain control for arbitrary PD gain levels, which may advantageously provide fine levels of gain control compared to systems which only provide calibration over a small number of fixed PD gain levels. Arbitrary PD gain control may advantageously increase detection response speed by allowing a system to "jump" directly to any desired gain level without needing extra time to servo to the desired gain level by iterative incremental adjustment and feedback cycles. Fine gain control may advantageously allow optimum gain levels to be achieved, rather than being limited to predetermined gain level options which may be suboptimal for a given scenario.

Various embodiments enable controlling a signal level of the PD by monitoring the current gain level. In various implementations, such embodiments advantageously provide control without requiring a servo mechanism. Because a servo mechanism may evaluate the PD output signal level versus change to the PD input voltage, response speed is negatively impacted. Due to a high PD voltage to gain slope, very fine servo steps may be needed to achieve the desired gain level to prevent an unstable, ringing servo. In such a servo mechanism PD voltage may take a long time to settle to a desired value, for example, on the order of hundreds of milliseconds due to the PWM nature of many PD voltage drivers. Accordingly, in servo embodiments, it may take seconds or minutes to servo to a desired gain level. In many industrial sensors, response speeds of less than a millisecond are often desired, with response speeds on the order of tens of milliseconds often acceptable. Therefore, various embodiments disclosed herein advantageously avoid such servo mechanisms in order to achieve faster response speeds by providing apparatus and methods to directly adjust the PD to a desired gain level.

PDs (including APDs) may, for example, be used for time-of-flight (TOF) principle distance measurement systems. In TOF systems, the amplitude of the signal as measured by the photodiode may be directly related to the accuracy of the distance measurement. Changes in gain levels may shift the timing of the signal. Changes in gain levels may also change the shape of the signal such as, for example, time required for a leading-edge pulse to rise, and strength of the leading-edge pulse. In various systems, changes on the order of 67 picoseconds may represent 1 cm of distance error, and changes on the order of 6.7 ns may represent 1 meter of distance error. Various embodiments, therefore, provide control over the electrical gain path and signal amplitudes by monitoring current PD gain and temperature and directly controlling PD gain by PD driving voltage may provide critical advantages in improving distance measurement accuracy to at least the 1 cm level.

In various implementations, each PD unit may be calibrated over temperature to generate a unique 3D surface, such as is discussed in reference to FIG. 13, correlating a desired PD gain to both control signal and temperature. In an illustrative example, a 3D surface may be generated during manufacturing and programmed into an OLCC to compensate each OLCC over temperature. The 3D surface may enable the generation of a desired PD gain at any temperature.

In various implementations, it may be desirable to reduce production time and cost associated with a per-unit temperature calibration. Various such implementations may use family-based temperature compensation. A predetermined sample of PDs may have their gain curve profiled over multiple temperatures. For example, by way of example and not limitation, the gain curve may be profiled from near the PD activation threshold (when gain>0 in response to an input voltage) to near the Geiger-mode upper level. In some examples, PD characterization may be based on multiple components in a random lot or batch. Further, the characterization may be computed on an individual component basis. In some examples, the characterization may be a family of compensation curves, and may be based on one or more representative PD samples.

For example, curves of multiple PDs, at a multitude of target PD gain levels may be combined to create a family compensation profile valid at each of the target PD gain levels. A two-dimensional equation may be used to represent the compensation profile. In various embodiments, the family combined temperature and PD gain profile surface may be implemented as one or more equations, LUTs, or combinations thereof. In various implementations, the family combined temperature and PD gain profile may be adjusted for each individual PD to correlate to an individual PD gain calibration at a single reference temperature. For example, an individual PD gain calibration may be performed at standard operating conditions at room temperature, and at least one adjustment (e.g., scaling coefficient, an offset coefficient, equation) may be set for that PD to compensate the family temperature and voltage vs gain profile to the specific PD.

In various embodiments, PD temperature may be measured, for example, by thermistors, digital temperature sensors, thermocouples, or resistance temperature detectors. Temperature compensation may be calibrated to an input temperature measurement. In various implementations, temperature may be measured in degrees Celsius, degrees Fahrenheit, Kelvins, analog current or voltage, a digital signal converted by an ADC from an analog signal representing temperature, other appropriate temperature-correlated signal, or some combination thereof. In some embodiments, the ambient temperature may be measured directly on the casing of a PD. Further, temperature measurements may be taken in more than one location, and the measurements may be combined in a function or used to extrapolate a resulting temperature to be used in an OLCC as described.

In some embodiments, a multi-order polynomial equation may be employed within an OLCC (e.g., as discussed in reference to FIGS. 1-2) to calculate PD input voltage for a given PD commanded gain. In some examples, the polynomial may not be limited to a $1^{st}$, $2^{nd}$, or $3^{rd}$ order expression. The polynomial equation may take the form of:

$$y(x,T)=A(T)x^2+B(T)x+C(T), \quad \text{EQUATION 2:}$$

Where:
x is the PD input voltage,
y is the input voltage to an PD, and
A, B and C are coefficients that are temperature dependent.

Further, in some embodiments, pre-programmed code may employ an equation instead of an LUT to determine the input voltage for the PD. The software may employ the equation directly, advantageously occupying a smaller memory space. In some examples, an LUT containing the results of the equation may be employed, advantageously increasing software execution speed.

In some examples, a digitized temperature and a digitized voltage may be connected to the address lines of a Read-Only Memory (ROM) programmed with predetermined values, such that a surface such as is discussed in relation to FIG. 13 may result. The digital values may then be fed to a Digital to Analog Converter (DAC) which may control a voltage output drive. The voltage output then may drive the PD to a desired gain. Further, in such configurations the OLCC may be implemented without a microcontroller.

The OLCC may be advantageously employed in applications that operate over a wide dynamic range. Such applications may utilize a wider range of an operation curve of a laser. Accordingly, these applications may be operable in both the employment of highly reflective targets as well as dark targets. These applications may also be operable in both close-range and long-range measurements.

In various embodiments, the OLCC PD gain control may involve a method of first determining a PD response curve at a reference temperature, storing the curve in the OLCC memory, determining a response curve at one or more additional temperatures, determining from more than one response curve, each at a different temperature, a compensation on the PD voltage that maintains an arbitrary PD gain at an arbitrary temperature, and storing this compensation in the OLCC memory.

In various embodiments, the OLCC PD gain control may involve a method of first determining an PD response curve at a reference temperature, storing the curve in the OLCC memory, determining a PD response curve from a subset of PDs at one or more additional temperatures, determining, by combining from a subset of PDs, more than one PD response curve, each at a different temperature, a compensation on the PD voltage that maintains an arbitrary PD gain level at an arbitrary temperature, and storing this compensation in the OLCC memory.

In various embodiments, the OLCC PD gain control for a light-based displacement or distance measurements sensor may first involve setting a desired PD gain level, storing the calibration and compensation into a memory unit, which may be used to determine a voltage input level that results in the desired PD gain level given an estimation of the PD temperature.

In some examples, the OLCC PD gain control may employ the calibrated efficiency and compensation to set a PD input voltage level in order to output a desired PD output voltage level given the estimated PD temperature. The input voltage level may be set via a DAC output from a processor.

The response curve may not be limited to a linear gain response region of an PD. The temperature compensation curve may not be limited to a linear compensation curve.

Various implementations may be applied to commercial and industrial settings, for example, photoelectric sensors, optical measurement sensors (including triangulation and time-of-flight), optical media, and fiber-optic communications.

In various embodiments, one or more PD may be replaced with a related voltage to gain photosensitive element such as, by way of example and not limitation, multi-pixel-photon-counters (MPPC), silicon-photomultipliers (SIPM), single-photon avalanche diode (SPAD), and single-pixel-photon-counters (SPPC).

Various embodiments may include at least one array of PD elements. The array may be one dimensional, two-dimensional, or three-dimensional. An array may be linear, planar, curvilinear, irregular, or other suitable geometry. The PDs may be controlled individually, or may be controlled in groups, where a single desired gain is effectuated by a single control value. The temperature input may be aggregated or averaged across multiple PDs. A single temperature input may be monitored for a PD array, or a portion of a PD array. PD input voltage may be controlled individually, for an entire array, or a portion thereof. For example, a discrete array unit may have a common rail carrying a voltage commanded to control the gain of the PDs in the array.

Various embodiments herein refer to PDs in general, APDs in particular, or both. In general, APDs may be PDs with a structure optimized for operating with high reverse bias, approaching the reverse breakdown voltage. This may allow each photo-generated carrier to be multiplied by avalanche breakdown, resulting in internal gain within the PD, which may advantageously increase the effective responsivity of the device. Accordingly, various embodiments described in reference to APDs may be implemented with a PD designed to operate in high reverse bias voltage, which may include voltage near or beyond the breakdown voltage. Various embodiments described in reference to PDs may be implemented with PDs designed to operate in high reverse bias voltage, including near or beyond the breakdown voltage. Various embodiments may advantageously be implemented specifically using APDs.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, WiFi-Direct, Li-Fi, Bluetooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In an exemplary aspect, an avalanche photodiode (APD) based gain control apparatus may be adapted to generate signals to control relative gain of at least one APD element. The apparatus may include: a sensor configured to measure temperature information indicative of a temperature of an APD element; a controller operably coupled to the sensor and configured to: (a) receive the measured temperature information; and, (b) receive a commanded APD relative gain level signal, the commanded APD relative gain level signal representing a desired APD gain level relative to a predetermined reference gain, the desired APD gain level to be generated by the APD element in response to a drive voltage supplied to an input of the APD element; and, a data store operably coupled to the controller. The data store may contain information about a predetermined efficiency characteristic that relates the commanded APD relative gain level signal by the APD element to a drive voltage supplied to the APD element. the predetermined efficiency characteristic information may include adjustments responsive to the measured temperature of the APD element for a plurality of temperatures. The controller may be further configured to retrieve at least a portion of the predetermined efficiency characteristic information sufficient to determine the drive voltage such that, when the drive voltage is supplied to the APD element while operating at the temperature of the APD element indicated by the measured temperature information, the drive voltage is operable to cause the APD element to generate substantially the desired APD gain level. When the retrieved predetermined efficiency characteristic information indicates that the desired APD gain level at the measured temperature of the APD element corresponds to a substantially non-linear portion of the predetermined efficiency characteristic, the controller may be further configured to determine the drive voltage signal based upon the retrieved predetermined efficiency characteristic as a function of the commanded APD relative gain level signal and the measured temperature information. The apparatus may further include a driver circuit operatively coupled to the controller and to the input of the APD element, the driver circuit being configured to supply the determined drive voltage signal to the input of the APD element. The determined drive voltage signal may be operative to generate a gain level from the APD element, relative to the predetermined reference gain, substantially at the desired APD gain level.

In the apparatus, the non-linear portion of the predetermined efficiency characteristic may be characterized by an absolute value of the second derivative of the generated APD gain level with respect to the drive voltage exceeding a predetermined threshold. The non-linear portion of the predetermined efficiency characteristic may be characterized by a variance from a linear extrapolation of the slope at a predetermined nominal operating point exceeding a predetermined threshold. The predetermined efficiency characteristic may include information stored in the data store in at least one look up table. The predetermined efficiency characteristic may include information stored in the data store in the form of a plurality of coefficients of a non-linear function for at least one predetermined efficiency characteristic of the APD element. The predetermined efficiency characteristic may include information stored in the data store in the form of temperature adjustment information to compensate a determined drive voltage signal at a nominal temperature to a determined drive voltage signal according to the received measured temperature information.

In an exemplary aspect, a method to generate signals to control gain level of an avalanche photodiode (APD)-based element may include measure, with a sensor, temperature information indicative of a temperature of an APD element; receive, at a controller, the measured temperature information; receive, at the controller, a commanded APD relative gain level signal. The commanded APD relative gain level signal may represent a desired APD gain level relative to a predetermined reference gain. The desired APD gain level may be generated by the APD element in response to a drive voltage supplied to an input of the APD element. The method may further include provide a data store operably coupled to the controller, where the data store contains information about a predetermined efficiency characteristic that relates the commanded APD relative gain level signal to a drive voltage supplied to the APD element. The predetermined efficiency characteristic information may include adjustments responsive to the measured temperature of the APD element for a plurality of temperatures. The method may further include retrieve, with the controller, at least a portion of the predetermined efficiency characteristic information sufficient to determine the drive voltage such that, when the drive voltage is supplied to the APD element while operating at the temperature of the APD element indicated by the measured temperature information, the drive voltage is operable to cause the APD element to generate substantially the desired APD gain level. The method may further include: when the retrieved predetermined efficiency characteristic information indicates that the desired APD gain level at the measured temperature of the APD element corresponds to a substantially non-linear portion of the predetermined efficiency characteristic, determine the drive voltage signal based upon the retrieved predetermined efficiency characteristic as a function of the commanded APD relative gain level signal and the measured temperature information; and, supply, to the input of the APD element, the determined drive voltage signal operative to generate a gain level from the APD element, relative to the predetermined reference gain, substantially at the desired APD gain level.

The non-linear portion of the predetermined efficiency characteristic may be characterized by an absolute value of the second derivative of the relative APD gain level with respect to the drive voltage exceeding a predetermined threshold. The non-linear portion of the predetermined efficiency characteristic may be characterized by a variance from a linear extrapolation of the slope at a predetermined nominal operating point exceeding a predetermined threshold. The method may further include convert, at an analog-to-digital converter, an analog signal received from the sensor and indicative of the measured temperature to a digital signal representing the measured temperature information. The determined drive voltage may include an amplitude of a gate drive signal to supply to an input of the APD element to cause the APD element to generate substantially the desired APD gain level. The step of supply the determined drive voltage signal may further include convert, with a digital-to-analog converter, the determined drive voltage signal from a digital representation in the controller to an analog signal.

The method may further include provide a driver circuit operatively coupled to the controller and to the input of the APD element, the driver circuit being configured to supply the determined drive voltage signal to the input of the APD element. The method may further include retrieve, with the controller, the commanded APD relative gain level signal from a non-volatile memory location. The plurality of temperatures may include a predetermined range of temperatures. The predetermined range of temperatures may extend from negative 40 to positive 85 degrees Celsius.

The predetermined efficiency characteristic may include information stored in the data store in at least one look up table. The predetermined efficiency characteristic may include information stored in the data store in the form of a plurality of coefficients of a non-linear function for at least one predetermined efficiency characteristic of the APD element. The plurality of coefficients may be a function of the commanded APD relative gain level signal.

The predetermined efficiency characteristic may include information stored in the data store in the form of temperature adjustment information to compensate a determined drive voltage signal at a nominal temperature to a determined drive voltage signal according to the received measured temperature information. The predetermined efficiency characteristic information may represent a normative efficiency characteristic statistically determined from one or more APD elements in the same lot as said APD element.

The predetermined efficiency characteristic information may include a drive voltage resolution in response to the commanded APD relative gain level signal as a function of temperature. The step of determine the drive voltage signal based upon the retrieved predetermined efficiency characteristic as a function of the commanded APD relative gain level signal and the measured temperature information may include generate the drive voltage signal based on a minimum resolution criterion. The drive voltage signal may be greater than a reverse breakdown voltage of the APD element.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An avalanche photodiode (APD) gain control apparatus adapted to generate signals to control relative gain of at least one APD element, the apparatus comprising:
   a sensor configured to measure temperature information indicative of a temperature of an APD element;
   a controller operably coupled to the sensor and configured to:
   (a) receive the measured temperature information; and,
   (b) receive a commanded APD relative gain level signal, the commanded APD relative gain level signal representing a desired APD gain level relative to a predetermined reference gain, the predetermined reference gain providing a predetermined reference to a current target gain level of the APD element and to the desired APD gain level, wherein the desired APD gain level is a desired output gain to be generated by the APD element in response to a drive voltage supplied to an input of the APD element;

a data store operably coupled to the controller, wherein:
the data store contains information about a predetermined efficiency characteristic that relates the commanded APD relative gain level signal by the APD element to a drive voltage supplied to the APD element,
the predetermined efficiency characteristic information comprises adjustments responsive to the measured temperature of the APD element for a plurality of temperatures,
the controller is further configured to retrieve at least a portion of the predetermined efficiency characteristic information sufficient to determine the drive voltage such that, when the drive voltage is supplied to the APD element while operating at the temperature of the APD element indicated by the measured temperature information, the drive voltage is operable to cause the APD element to generate substantially the desired APD gain level;
when the retrieved predetermined efficiency characteristic information indicates that the desired APD gain level at the measured temperature of the APD element corresponds to a substantially non-linear portion of the predetermined efficiency characteristic of the commanded APD relative gain level signal and the measured temperature information; and,
a driver circuit operatively coupled to the controller and to the input of the APD element, the driver circuit being configured to supply the determined drive voltage signal to the input of the APD element, wherein
the determined drive voltage signal is operative to generate a gain level from the APD element, relative to the predetermined reference gain, substantially at the desired APD gain level.

2. The apparatus of claim 1, wherein the predetermined efficiency characteristic comprises information stored in the data store as a plurality of coefficients of a nonlinear function for at least one predetermined efficiency characteristic of the APD element.

3. The apparatus of claim 1, wherein the predetermined efficiency characteristic comprises information stored in the data store as temperature adjustment information to compensate a determined drive voltage signal at a nominal temperature to a determined drive voltage signal according to the received measured temperature information.

4. A method to generate signals to control gain level of an avalanche photodiode (APD) element, the method comprising:
measure, with a sensor, temperature information indicative of a temperature of an APD element;
receive, at a controller, the measured temperature information;
receive, at the controller, a commanded APD relative gain level signal, the commanded APD relative gain level signal representing a desired APD gain level relative to a predetermined reference gain, the predetermined reference gain providing a predetermined reference to a current target gain level of the APD element and to the desired APD gain level, wherein the desired APD gain level is a desired output gain to be generated by the APD element in response to a drive voltage supplied to an input of the APD element;
provide a data store operably coupled to the controller, wherein the data store contains information about a predetermined efficiency characteristic that relates the commanded APD relative gain level signal to a drive voltage supplied to the APD element, the predetermined efficiency characteristic information including adjustments responsive to the measured temperature of the APD element for a plurality of temperatures;
retrieve, with the controller, at least a portion of the predetermined efficiency characteristic information sufficient to determine the drive voltage such that, when the drive voltage is supplied to the APD element while operating at the temperature of the APD element indicated by the measured temperature information, the drive voltage is operable to cause the APD element to generate substantially the desired APD gain level;
when the retrieved predetermined efficiency characteristic information indicates that the desired APD gain level at the measured temperature of the APD element corresponds to a substantially non-linear portion of the predetermined efficiency characteristic, determine the drive voltage signal based upon the retrieved predetermined efficiency characteristic as a function of the commanded APD relative gain level signal and the measured temperature information; and,
supply, to the input of the APD element, the determined drive voltage signal operative to generate a gain level from the APD element, relative to the predetermined reference gain, substantially at the desired APD gain level.

5. The method of claim 4, wherein the non-linear portion of the predetermined efficiency characteristic is characterized by an absolute value of a second derivative of the relative APD gain level with respect to the drive voltage exceeding a predetermined threshold such that, when the predetermined threshold is exceeded, the drive voltage signal is determined based on a function having the non-linear portion characterized by the absolute value of the second derivative.

6. The method of claim 4, wherein the non-linear portion of the predetermined efficiency characteristic is mathematically characterized by a variance from a linear extrapolation of a slope at a predetermined nominal operating point exceeding a predetermined threshold such that, when the predetermined threshold is exceeded, the drive voltage signal is determined based on a function having the non-linear portion characterized by the variance from the linear extrapolation.

7. The method of claim 4, further comprising: convert, at an analog-to-digital converter, an analog signal received from the sensor and indicative of the measured temperature to a digital signal representing the measured temperature information.

8. The method of claim 4, wherein the determined drive voltage comprises an amplitude of a gate drive signal to supply to the input of the APD element to cause the APD element to generate substantially the desired APD gain level.

9. The method of claim 4, wherein the step of supply the determined drive voltage signal further comprises: convert, with a digital-to-analog converter, the determined drive voltage signal from a digital representation in the controller to an analog signal.

10. The method of claim 4, further comprising: provide a driver circuit operatively coupled to the controller and to the input of the APD element, the driver circuit being configured to supply the determined drive voltage signal to the input of the APD element.

11. The method of claim 4, further comprising: retrieve, with the controller, the commanded APD relative gain level signal from a non-volatile memory location.

12. The method of claim 4, wherein the plurality of temperatures comprises a predetermined range of temperatures.

13. The method of claim 12, wherein the predetermined range of temperatures extends from negative 40 to positive 85 degrees Celsius.

14. The method of claim 4, wherein the predetermined efficiency characteristic comprises information stored in the data store in at least one look up table.

15. The method of claim 4, wherein the predetermined efficiency characteristic comprises information stored in the data store as a plurality of coefficients of a non-linear function for at least one predetermined efficiency characteristic of the APD element.

16. The method of claim 15, wherein at least one of the plurality of coefficients is a predetermined function of the commanded APD relative gain level signal.

17. The method of claim 4, wherein the predetermined efficiency characteristic comprises information stored in the data store as temperature adjustment information to compensate a determined drive voltage signal at a nominal temperature to a determined drive voltage signal according to the received measured temperature information.

18. The method of claim 4, wherein the predetermined efficiency characteristic information represents a normative efficiency characteristic statistically determined from one or more APD elements in a same lot as the APD element.

19. The method of claim 4, wherein:
the predetermined efficiency characteristic information comprises a drive voltage resolution in response to the commanded APD relative gain level signal as a function of temperature, and determine the drive voltage signal based upon the retrieved predetermined efficiency characteristic as a function of the commanded APD relative gain level signal and the measured temperature information comprises generate the drive voltage signal as a function of a minimum resolution criterion.

20. The method of claim 4, wherein the drive voltage signal is greater than a reverse breakdown voltage of the APD element.

* * * * *